(12) United States Patent
Takeuchi et al.

(10) Patent No.: US 8,568,839 B2
(45) Date of Patent: Oct. 29, 2013

(54) LIQUID CRYSTAL COMPOSITION AND RETARDATION FILM

(75) Inventors: Hiroshi Takeuchi, Ashigarakami-gun (JP); Mitsuyoshi Ichihashi, Minami-ashigara (JP); Ryo Hamasaki, Minami-ashigara (JP)

(73) Assignee: FUJIFILM Corporation, Minato-Ku, Tokyo (JP)

( * ) Notice: Subject to any disclaimer, the term of this patent is extended or adjusted under 35 U.S.C. 154(b) by 302 days.

(21) Appl. No.: 12/569,225

(22) Filed: Sep. 29, 2009

(65) Prior Publication Data

US 2010/0078593 A1   Apr. 1, 2010

(30) Foreign Application Priority Data

Sep. 30, 2008 (JP) ................................. 2008-252930

(51) Int. Cl.
| | |
|---|---|
| *G02B 5/30* | (2006.01) |
| *C09K 19/30* | (2006.01) |
| *C09K 19/32* | (2006.01) |
| *C09K 19/34* | (2006.01) |
| *C09K 19/20* | (2006.01) |

(52) U.S. Cl.
USPC .................. 428/1.1; 252/299.61; 252/299.62; 252/299.63; 252/299.97

(58) Field of Classification Search
USPC ............. 252/299.01, 299.61, 299.62, 299.63, 252/299.66, 299.67; 428/1.1; 349/117
See application file for complete search history.

(56) References Cited

U.S. PATENT DOCUMENTS

| | | | |
|---|---|---|---|
| 5,995,184 A | 11/1999 | Chung et al. | |
| 6,156,860 A | 12/2000 | Tanaka et al. | |

(Continued)

FOREIGN PATENT DOCUMENTS

| | | | |
|---|---|---|---|
| JP | 10-230154 A | 9/1998 | |
| JP | 2000-105315 A | 4/2000 | |

(Continued)

OTHER PUBLICATIONS

Japanese Office Action mailed Jun. 11, 2013, in corresponding Japanese Patent Application No. 2008-252930, together with a partial English language translation thereof.

*Primary Examiner* — Shean C Wu

(74) *Attorney, Agent, or Firm* — Buchanan Ingersoll & Rooney PC

(57) ABSTRACT

The invention relates to a liquid crystal composition comprising two or more species of liquid crystal compounds respectively having a polymerizable group, at least one species of which being a compound represented by formula (I) below, having a content of the compound of from 20% to 80% relative to the total mass of said two or more species of liquid crystal compounds. In formula (I), $P^1$ represents a polymerizable group; each of $L^1$ and $L^2$ represents a divalent spacer group; each of $Z^1$ to $Z^4$ represents a divalent linking group; each of $A^1$ and $A^2$ represents a divalent cyclic group; each of m and n represents an integer from 0 to 3; MA represents any one group of A-I to A-V below:

$$P^1\text{-}L^1(Z^1\text{-}A^1)_m\text{-}Z^3\text{-}MA\text{-}Z^4\text{-}(A^2\text{-}Z^2)_n\text{-}L^2\text{-}R^0 \quad (I)$$

16 Claims, No Drawings

(56) References Cited

U.S. PATENT DOCUMENTS

| | | |
|---|---|---|
| 6,313,244 B1 | 11/2001 | Tanaka et al. |
| 6,384,168 B1 | 5/2002 | Tanaka et al. |
| 6,548,126 B1 | 4/2003 | Sasada et al. |
| 7,067,179 B1 * | 6/2006 | Ogawa et al. .................. 428/1.1 |
| 7,087,272 B2 * | 8/2006 | Bremer et al. ................. 428/1.1 |
| 7,157,124 B2 * | 1/2007 | Sasada et al. ................. 428/1.1 |
| 7,378,135 B2 | 5/2008 | Saigusa et al. |
| 7,410,677 B2 * | 8/2008 | Hirai et al. .................... 428/1.1 |
| 2002/0103316 A1 | 8/2002 | Tanaka et al. |
| 2003/0077405 A1 | 4/2003 | Miyazawa et al. |
| 2003/0203128 A1 | 10/2003 | Shundo |
| 2004/0106798 A1 | 6/2004 | Bremer et al. |
| 2004/0222403 A1 * | 11/2004 | Sasada et al. ............ 252/299.01 |
| 2005/0224754 A1 * | 10/2005 | Hirai et al. ............... 252/299.01 |
| 2006/0222784 A1 | 10/2006 | Saigusa et al. |

FOREIGN PATENT DOCUMENTS

| | | |
|---|---|---|
| JP | 2001-139511 A | 5/2001 |
| JP | 2002-371026 A | 12/2002 |
| JP | 2003-128665 A | 5/2003 |
| JP | 2003-238491 A | 8/2003 |
| JP | 2004-531508 A | 10/2004 |
| JP | 2006-291096 A | 10/2006 |
| JP | 2006-307150 A | 11/2006 |
| JP | 2008-138142 A | 6/2008 |

* cited by examiner

LIQUID CRYSTAL COMPOSITION AND RETARDATION FILM

CROSS-REFERENCE TO RELATED APPLICATIONS

This application claims benefit of priority under 35 U.S.C. 119 to Japanese Patent Application No. 2008-252930, filed on Sep. 30, 2008, which is expressly incorporated herein by reference in its entirety.

BACKGROUND OF THE INVENTION

1. Technical Field

The present invention relates to a liquid crystal composition useful for preparing optical components such as optical compensation film, used for liquid crystal display devices and so forth, and a retardation film composed of the liquid crystal composition.

2. Background Art

Conventionally, polymerizable rod-like liquid crystal compounds have widely been used for producing optical compensation films. In the process of aligning the rod-like liquid crystalline molecules on an alignment film, the molecules at around the interface with the alignment film may horizontally be aligned with their longitudinal axes laid in parallel with the film surface, meanwhile the molecules at around the interface with the air tend to align obliquely at a certain tilt angle, often showing a state of hybrid alignment as a whole. In the conventional process of forming an optically anisotropic film having the rod-like liquid crystal compound uniformly and horizontally aligned therein, methods having occasionally been adopted include a method of sandwiching a rod-like liquid crystal compound layer with an upper alignment film and a lower alignment film to thereby form a retardation film, followed by separation of the alignment films; and a method of reducing the tilt angle on the air interface side by adding a surfactant (for example, Japanese Laid-Open Patent Publication Nos. 2003-238491 and 2000-105315). The method of separating the alignment films from the retardation film after formation thereof occasionally resulted in breakage and scratching of the retardation film in the process of separation. On the other hand, the method of adding a surfactant occasionally resulted in eye holes (hajiki) or poor adhesion on the alignment films due to action of the surfactant exerted on the alignment film, leaving the problems for further improvement.

SUMMARY OF THE INVENTION

It is therefore an object of the present invention to provide a liquid crystal composition capable which allows stable horizontal alignment, and a retardation film composed of the liquid crystal composition.

[1] A liquid crystal composition comprising two or more species of liquid crystal compounds respectively having a polymerizable group, at least one species of which being a compound represented by formula (I) below, having a content of the compound represented by the formula below (I) of from 20% by mass to 80% by mass relative to the total mass of said two or more species of liquid crystal compounds:

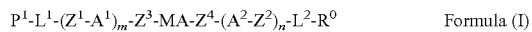   Formula (I)

where, $P^1$ represents a polymerizable group; each of $L^1$ and $L^2$ independently represents a divalent spacer group; each of $Z^1$ to $Z^4$ independently represents a divalent linking group; each of $A^1$ and $A^2$ independently represents a divalent cyclic group; each of m and n independently represents an integer from 0 to 3; MA represents any one group of A-I to A-V below:

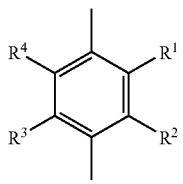

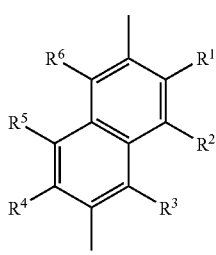

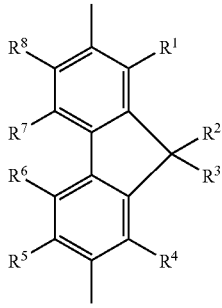

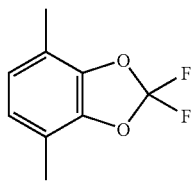

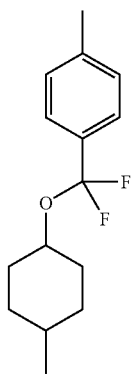

[each of $R^1$ to $R^8$ independently represents hydrogen atom, fluorine atom, chlorine atom, —$CF_3$, —$CF_2H$, —$CF_2CF_3$, —$CF_2CF_2H$, or —$CH_2CF_3$, where at least two of $R^1$ to $R^4$ in A-I, at least two of $R^1$ to $R^6$ in A-II, and at least two of $R^1$ to $R^8$ in A-III represent groups other than hydrogen atom]; and $R^0$ represents a hydrogen atom or substituent.

[2] The liquid crystal composition of [1], wherein the content of the compound represented by formula (I) is from 40% by mass to 80% by mass relative to the total mass of said two or more species of liquid crystal compounds.

[3] The liquid crystal composition of claim [1] or [2], wherein $R^0$ in formula (I) represents a hydrogen atom, alkyl group or polymerizable group.

[4] The liquid crystal composition of any one of [1] to [3], wherein $P^1$ in formula (I) represents a group represented by any one of formulae P1, P2, P3 and P4 below:

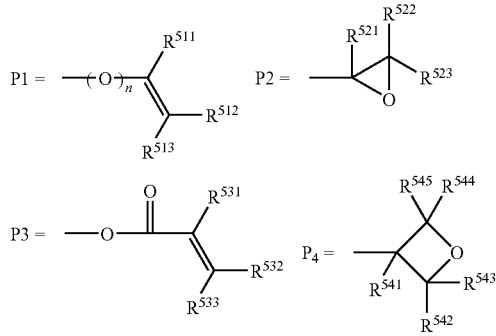

where, each of $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently represents a hydrogen atom or alkyl group, and n represents 0 or 1.

[5] The liquid crystal composition of any one of [1] to [4], wherein MA in formula (I) represented by any one of A-I to A-V below:

A-I

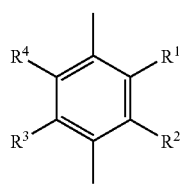

A-II

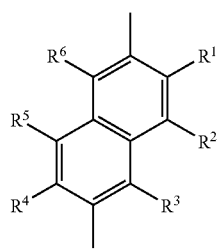

A-III

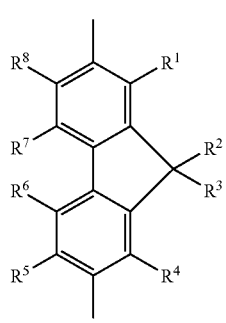

A-IV

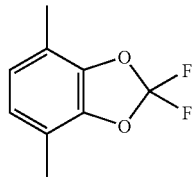

A-V

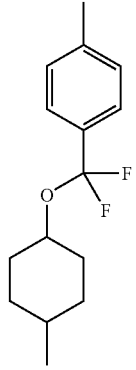

where each of $R^1$ to $R^8$ independently represents a hydrogen atom, fluorine atom, chlorine atom, —$CF_3$, —$CF_2H$, —$CF_2CF_3$, —$CF_2CF_2H$, or —$CH_2CF_3$, where at least two of each set of $R^1$ to $R^4$ of A-I, $R^1$ to $R^6$ of A-II, and $R^1$ to $R^8$ of A-III represent groups other than hydrogen atom.

[6] The liquid crystal composition of any one of [1] to [5], wherein each of $A^1$ and $A^2$ is a substituted or non-substituted phenyl group, or substituted or non-substituted cyclohexyl group

[7] The liquid crystal composition of any one of [1] to [6], wherein each of $Z^1$ to $Z^4$ in formula (I) independently represents a single bond or the group selected from the group consisting of

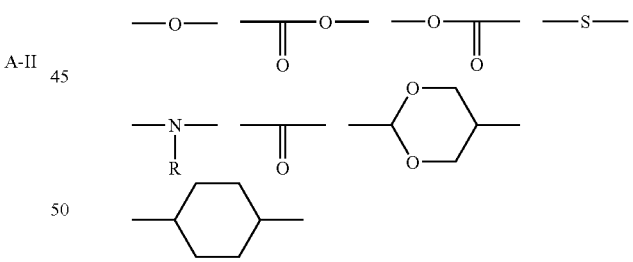

—O—$CF_2$—, alkylene group having 1 to 6 carbon atoms, and —≡—.

[8] The liquid crystal composition of any one of [1] to [7], wherein each of $L^1$ and $L^2$ in formula (I) independently represents a single bond, or alkylene group having 1 to 20 carbon atoms, provided that, in the alkylene group, an arbitrary —$CH_2$— may be replaced by —O—, —S—, —COO—, —OCO—, —CH=CH—, —CF=CF— or —C≡C—, and an arbitrary hydrogen atom may be replaced by a halogen atom.

[9] The liquid crystal composition of any one of [1] to [8], comprising a compound represented by formula (II) below, with a content of 20% by mass or more and 80% by mass or less relative to the total mass of said two species or more of liquid crystal compounds:

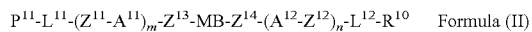

where, $P^{11}$ represents a polymerizable group; each of $L^{11}$ and $L^{12}$ independently represents a divalent spacer group; each of $Z^{11}$ to $Z^{14}$ independently represents a divalent linking group; each of $A^{11}$ and $A^{12}$ independently represents a divalent cyclic group; each of m and n represents an integer from 0 to 3; MB represents any one group of B-I to B-III below:

B-I

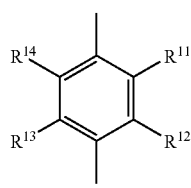

B-II

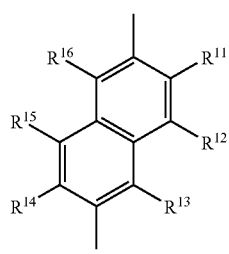

B-III

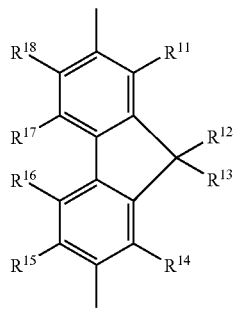

[each of $R^{11}$ to $R^{18}$ independently represents a hydrogen atom, bromine atom, —CN, —COR (R represents a hydrogen atom, or alkyl group having 1 to 6 carbon atoms), —COOR (R represents a hydrogen atom, or alkyl group having 1 to 6 carbon atoms), alkyl group having 1 to 6 carbon atoms, alkoxy group having 1 to 6 carbon atoms, or alkenyl group having 1 to 6 carbon atoms]; and $R^{10}$ represents a hydrogen atom or substituent.

[10] The liquid crystal composition of [9], wherein the compound represented by formula (II) has no fluorine atom.

[11] The liquid crystal composition of [9] or [10], wherein MB in formula (II) represents any one of B-1 to B-12:

B-1

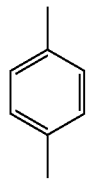

B-2

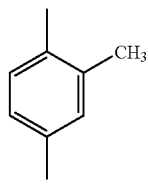

B-3

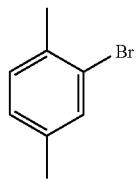

B-4

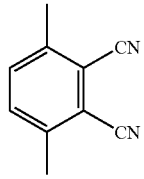

B-5

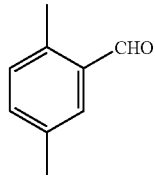

B-6

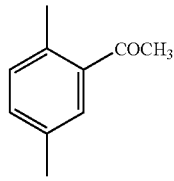

B-7

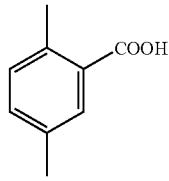

B-8

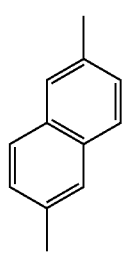

B-9

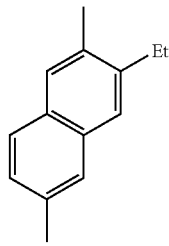

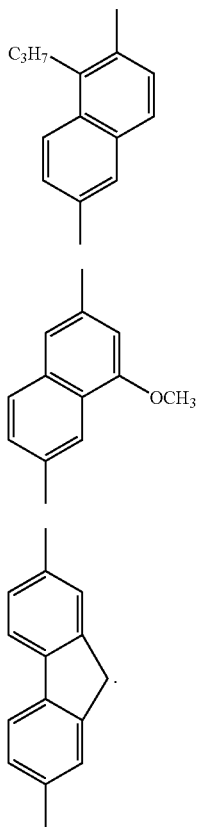

[12] The liquid crystal composition of any one of [9] to [11], wherein $R^{10}$ in formula (II) represents a hydrogen atom, alkyl group or polymerizable group.

[13] The liquid crystal composition of any one of [9] to [12], wherein $P^{11}$ in formula (II) represents a group represented by any one of formulae P1, P2, P3 and P4 below:

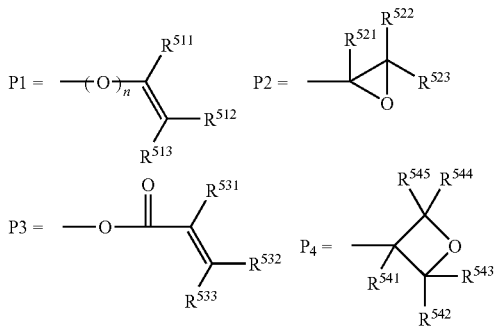

where, each of $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently represents a hydrogen atom or alkyl group, and n represents 0 or 1.

[14] The liquid crystal composition of any one of [9] to [13], wherein each of $A^{11}$ and $A^{12}$ is a substituted or non-substituted phenyl group, or substituted or non-substituted cyclohexyl group.

[15] The liquid crystal composition of any one of [9] to [14], wherein each of $Z^{11}$ to $Z^{14}$ in formula (II) independently represents a single bond or the group selected from the group consisting of —O—, —$\overset{O}{\underset{\|}{C}}$—O—, —O—$\overset{O}{\underset{\|}{C}}$—, —S—, —N—, —$\overset{O}{\underset{\|}{C}}$—, cyclic acetal group,
  |
  R cyclohexylene group, —O—CF$_2$—, alkylene group having 1 to 6 carbon atoms, and

—≡—.

[16] The liquid crystal composition of any one of [9] to [15], wherein each of $L^{11}$ and $L^{12}$ in formula (II) independently represents a single bond, or alkylene group having 1 to 20 carbon atoms, provided that, in the alkylene group, an arbitrary —CH$_2$— may be replaced by —O—, —S—, —COO—, —OCO—, —CH═CH—, —CF═CF— or —C≡C—, and an arbitrary hydrogen atom may be replaced by a halogen atom.

[17] A retardation film comprising the liquid crystal composition of any of [1] to [16].

According to the invention, it is possible to provide a liquid crystal composition capable which allows stable horizontal alignment, and a retardation film composed of the liquid crystal composition.

DETAILED DESCRIPTION OF THE INVENTION

The invention is described in detail hereinunder. Note that, in this patent specification, any numerical expressions in a style of "numerical value 1 to numerical value 2" will be used to indicate a range including the lower and upper limits.

Now, the terminology in this specification will be explained.

In this specification, the expression of "liquid crystal composition horizontally aligns" means that an average angle of inclination of the director of the liquid crystal molecules in a layer formed by coating a liquid crystal composition is smaller than 10°, and preferably 5° or smaller, away from the surface of the layer.

In this specification, it is also defined that the average angle of inclination of the director of the liquid crystal molecules is calculated based on optical characteristics of a retardation film obtained by curing typically by a polymerization reaction of the liquid crystal composition, and is understood as being synonymous to the angle of inclination of the slow axis of a retardation film. The optical characteristics of the retardation film may be measured using a commercially available retardation measuring instrument. Details of the measurement are as follow.

First, the in-plane optical anisotropy of the retardation film composed of a liquid crystal composition, which is a sample, is measured in the direction normal to the film surface, to thereby determine the slow axis and the fast axis. Next, the optical anisotropy of the retardation film is measured by inclining the film leftward and rightward, while assuming the fast axis as an axis of rotation. The average angle of inclination is calculated by simulation based on the angle of inclination and the measured optical anisotropy, while assuming that the directors of the liquid crystal molecules uniformly incline. Some of the commercially available retardation measuring instrument have software for calculating the average angle of inclination pre-installed therein, so that the average angle of inclination may be calculated using the software. The commercially available retardation measuring instruments may be exemplified by "KOBRA-WR" from Oji Scientific Instruments, "RETS-100" from Otsuka Electronics Co., Ltd., and "Muller Matrix Polarimeter" from AXOMETRICS, Inc. (U.S.A.).

The present invention relates to a liquid crystal composition which includes two or more species of liquid crystal compounds respectively having a polymerizable group, at least one species of which being a compound represented by formula (I) below:

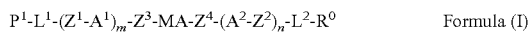
Formula (I)

where, $P^1$ represents a polymerizable group; each of $L^1$ and $L^2$ independently represents a divalent spacer group; each of $Z^1$ to $Z^4$ independently represents a divalent linking group; each of $A^1$ and $A^2$ independently represents a divalent cyclic group; each of m and n independently represents an integer from 0 to 3; MA represents any one group of A-I to A-V below:

A-I
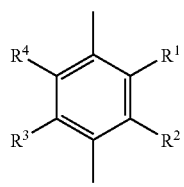

A-II
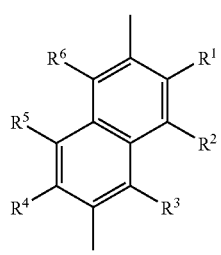

A-III
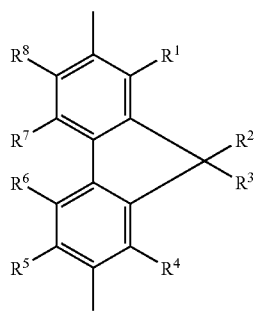

A-IV
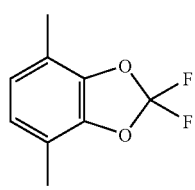

A-V
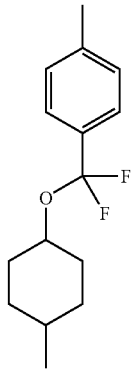

[each of $R^1$ to $R^8$ independently represents a hydrogen atom, fluorine atom, chlorine atom, —$CF_3$, —$CF_2H$, —$CF_2CF_3$, —$CF_2CF_2H$, or —$CH_2CF_3$, where at least two of $R^1$ to $R^4$ in A-I, at least two of $R^1$ to $R^6$ in A-II, and at least two of $R^1$ to $R^8$ in A-III represent groups other than hydrogen atom]; and $R^0$ represents a hydrogen atom or substituent.

The polymerizable group represented by $P^1$ in the formula in the above may preferably be a group capable of allowing addition polymerization reaction or condensation polymerization reaction to proceed. This sort of polymerizable group may preferably be a polymerizable ethylenic unsaturated group or ring-opening polymerizable group. Examples of the polymerizable group are shown below.

(M-1)
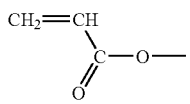

(M-2)
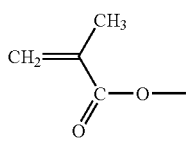

(M-3)
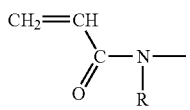

(M-4)
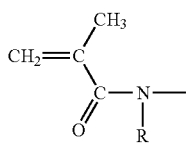

(M-5)
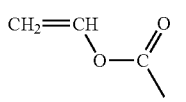

(M-6)
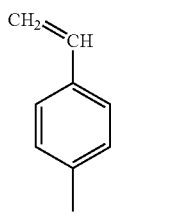

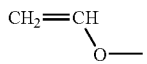

The polymerizable group is particularly preferably a functional group capable of allowing an addition polymerization reaction to proceed. This sort of polymerizable group is preferably a polymerizable ethylenic unsaturated group or ring-opening polymerizable group.

The polymerizable group is preferably a group represented by any one of formulae P1, P2, P3 and P4 below:

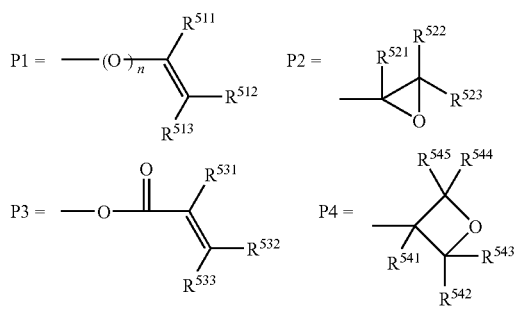

(where, each of $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently represents a hydrogen atom or alkyl group, and n represents 0 or 1).

In polymerizable group P1, each of $R^{511}$, $R^{512}$ and $R^{513}$ independently represents a hydrogen atom or alkyl group.

Alkoxy group, alkoxycarbonyl group and alkoxycarbonyloxy group residues substituted by polymerizable group P1 represent alkyleneoxy groups (for example, alkyleneoxy groups such as ethyleneoxy, propyleneoxy, butyleneoxy, pentyleneoxy, hexyleneoxy and heptyleneoxy groups; and substituted alkyleneoxy groups containing ether bond such as ethyleneoxyethoxy group); alkyleneoxycarbonyloxy groups (for example, alkyleneoxycarbonyloxy groups such as ethyleneoxycarbonyloxy, propyleneoxycarbonyloxy, butyleneoxycarbonyloxy, pentyleneoxycarbonyloxy, hexyleneoxycarbonyloxy, and heptyleneoxycarbonyloxy groups; and substituted alkyleneoxycarbonyloxy groups containing ether bond such as ethyleneoxyethoxycarbonyloxy group); and alkyleneoxycarbonyl groups (for example, alkyleneoxycarbonyl groups such as ethyleneoxycarbonyl, propyleneoxycarbonyl, butyleneoxycarbonyl, pentyleneoxycarbonyl, hexyleneoxycarbonyl, and heptyleneoxycarbonyl groups; and substituted alkyleneoxycarbonyl groups containing ether bond such as ethyleneoxyethoxycarbonyl group). Polymerizable group P1 may directly be bound to an aromatic ring.

In the formula, n Represents an integer of 0 or 1, and is preferably 1. When n is 1, polymerizable group P1 represents a substituted or non-substituted vinylether group. Each of $R^{511}$ and $R^{513}$ independently represents a hydrogen atom, alkyl group (exemplified by methyl, ethyl, n-propyl, isopropyl, n-butyl, pentyl, hexyl, heptyl, octyl and nonyl groups, preferably by lower alkyl groups such as methyl and ethyl groups, and more preferably by methyl group). Preferable combination is such as having a methyl group for $R^{511}$ and a hydrogen atom for $R^{513}$, or such as having hydrogen atoms both for $R^{511}$ and $R^{513}$.

$R^{512}$ represents a hydrogen atom, or substituted or non-substituted alkyl group (exemplified by methyl, ethyl, n-propyl, isopropyl, n-butyl, pentyl, hexyl, heptyl, octyl, nonyl, 2-chloroethyl, 3-methoxyethyl, and methoxyethoxyethyl groups, preferably by lower alkyl groups such as methyl and ethyl groups, and more preferably by methyl group), more preferably represents a hydrogen atom and lower alkyl group, and still more preferably represents a hydrogen atom. Accordingly, as polymerizable group P1, a non-substituted vinyloxy group, which is a functional group having a high polymerization activity, may generally and preferably be used.

Polymerizable group P2 represents a substituted or non-substituted oxylane group. Each of $R^{521}$ and $R^{522}$ independently represents a hydrogen atom, alkyl group (exemplified by methyl, ethyl, n-propyl, isopropyl, n-butyl, pentyl, hexyl, heptyl, octyl, and nonyl groups, preferably by lower alkyl groups such as methyl and ethyl groups, and more preferably by methyl group), wherein a preferable combination is such as having hydrogen atoms for both of $R^{521}$ and $R^{522}$.

$R^{523}$ represents a hydrogen atom, or substituted or non-substituted alkyl group (exemplified by methyl, ethyl, n-propyl, isopropyl, n-butyl, pentyl, hexyl, heptyl, octyl, nonyl, 2-chloroethyl, 3-methoxyethyl, and methoxyethoxyethyl groups, preferably by lower alkyl groups such as methyl and ethyl groups, and more preferably by methyl group), wherein hydrogen atom or lower alkyl group such as methyl, ethyl and n-propyl groups is preferable.

Polymerizable group P3 represents a substituted or non-substituted acryl group. Each of substituents $R^{531}$ and $R^{533}$ independently represents a hydrogen atom, alkyl group (exemplified by methyl, ethyl, n-propyl, isopropyl, n-butyl, pentyl, hexyl, heptyl, octyl, and nonyl groups, preferably by lower alkyl groups such as methyl and ethyl groups, and more preferably by methyl group), wherein a preferable combination is such as having a methyl group for $R^{531}$ and a hydrogen atom for $R^{533}$, or having hydrogen atoms both for $R^{531}$ and $R^{533}$.

$R^{532}$ represents a hydrogen atom, or substituted or non-substituted alkyl group (exemplified by methyl, ethyl, n-propyl, isopropyl, n-butyl, pentyl, hexyl, heptyl, octyl, nonyl, 2-chloroethyl, 3-methoxyethyl, and methoxyethoxyethyl groups, preferably by lower alkyl groups such as methyl and ethyl groups, and more preferably by methyl group), wherein a hydrogen atom is preferable. Accordingly, as polymerizable group P3, non-substituted acryloxy group, methacryloxy group, and crotonyloxy group, which are functional groups having a high polymerization activity, may generally and preferably be used.

Polymerizable group P4 represents a substituted or non-substituted oxetane group. Each of $R^{542}$, $R^{543}$, $R^{544}$ and $R^{545}$ independently represents a hydrogen atom, alkyl group (exemplified by methyl, ethyl, n-propyl, isopropyl, n-butyl, pentyl, hexyl, heptyl, octyl, and nonyl groups, preferably by lower alkyl groups such as methyl and ethyl groups, and more preferably by methyl group), wherein a preferable combination is such as having hydrogen atoms for all of $R^{542}$, $R^{543}$ and $R^{544}$.

$R^{541}$ represents a hydrogen atom, or substituted or non-substituted alkyl group (exemplified by methyl, ethyl, n-propyl, isopropyl, n-butyl, pentyl, hexyl, heptyl, octyl, nonyl, 2-chloroethyl, 3-methoxyethyl, and methoxyethoxyethyl groups, preferably by lower alkyl groups such as methyl and ethyl groups, and more preferably by methyl group), wherein hydrogen atom, or lower alkyl group such as methyl, ethyl and n-propyl groups is preferable.

Each of $L^1$ and $L^2$ in formula (I) independently represents a divalent spacer group, and is preferably a single bond, or alkylene group having 1 to 20 carbon atoms. In the alkylene group, an arbitrary —$CH_2$— may be replaced by —O—, —S—, —COO—, —OCO—, —CH═CH—, —CF═CF— or —C≡C—, and an arbitrary hydrogen atom may be replaced by a halogen atom.

Each of $Z^1$ to $Z^4$ in formula (I) independently represents a divalent linking group. While the divalent linking group are not specifically limited, examples of which include a single bond, groups represented by the formulae below:

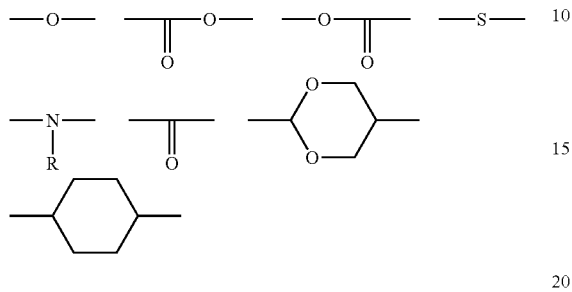

—O—CF$_2$—, alkylene group having 1 to 6 carbon atoms, and ═══, and more preferable examples include —O—, —COO—, and —OCO—.

Each of $A^1$ and $A^2$ in formula (I) independently represents a divalent cyclic group. The divalent cyclic group is preferably a substituted or non-substituted phenyl group, or substituted or non-substituted cyclohexyl group. The phenyl group and cyclohexyl group are preferably substituted at the 14-positions. The substituent owned by the phenyl group preferably contains fluorine atom(s), wherein examples of which include fluorine atom, —CF$_3$, —CF$_2$H, —CF$_2$CF$_3$, —CF$_2$CF$_2$H and —CH$_2$CF$_3$. The phenyl group and cyclohexyl group may be condensed with other ring, wherein examples of which include fluorenediyl group and tetrahydronaphthyl group. Preferable examples of $A^1$ and $A^2$ include phenyl group having at the 4-position a benzoyloxy group having at the 4-position a substituent; phenyl group having at the 4-position cyclohexyl group having at the 4-position a substituent; cyclohexyl group having at the 4-position a phenyl group having at the 4-position a substituent; and cyclohexyl group having at the 4-position a cyclohexyl group having at the 4-position a substituent.

Each of $A^1$ and $A^2$ may independently represent any one of A-I to A-V represented by MA.

In formula (I), $R^0$ represents a hydrogen atom or substituent. Examples of the substituent include —CN, —CF$_3$, —CF$_2$H, —CFH$_2$, —OCF$_3$, —OCF$_2$H, —N═C═O, —N═C═S, —F, —Cl, alkyl group having 1 to 20 carbon atoms, and polymerizable group. In the alkyl group having 1 to 20 carbon atoms, an arbitrary —CH$_2$— may be replaced by —O—, —S—, —CF$_2$—, —CH═CH—, —COO—, —OCO—, or CO—. Examples of the polymerizable group are similar to those of the above-described polymerizable group $P^1$. $R^0$ may have a polymerizable group equal to $P^1$.

In formula (I), MA is a group represented by any one of A-I to A-V below:

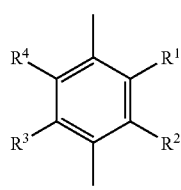

A-I

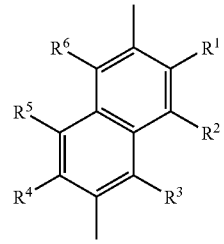

A-II

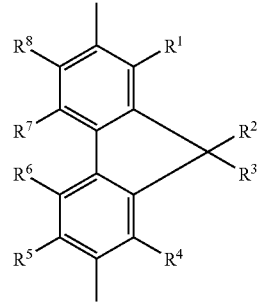

A-III

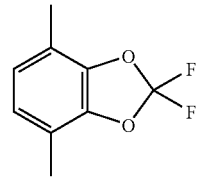

A-IV

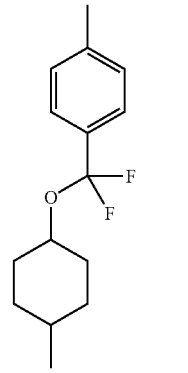

A-V

[each of $R^1$ to $R^8$ independently represents a hydrogen atom, fluorine atom, chlorine atom, —CF$_3$, —CF$_2$H, —CF$_2$CF$_3$, —CF$_2$CF$_2$H, or —CH$_2$CF$_3$, where at least two of each set of $R^1$ to $R^4$ of A-I, $R^1$ to $R^6$ of A-II, and $R^1$ to $R^8$ of A-III represent groups other than hydrogen atom].

Among these, A-I, A-III, A-IV and A-V are preferable.

Examples of MA are shown below, without limitation.

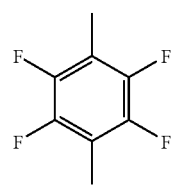

M-1

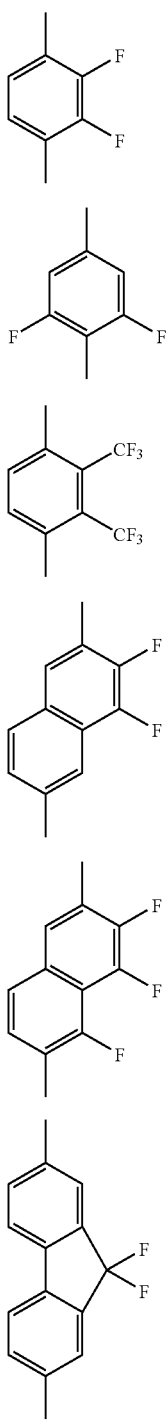
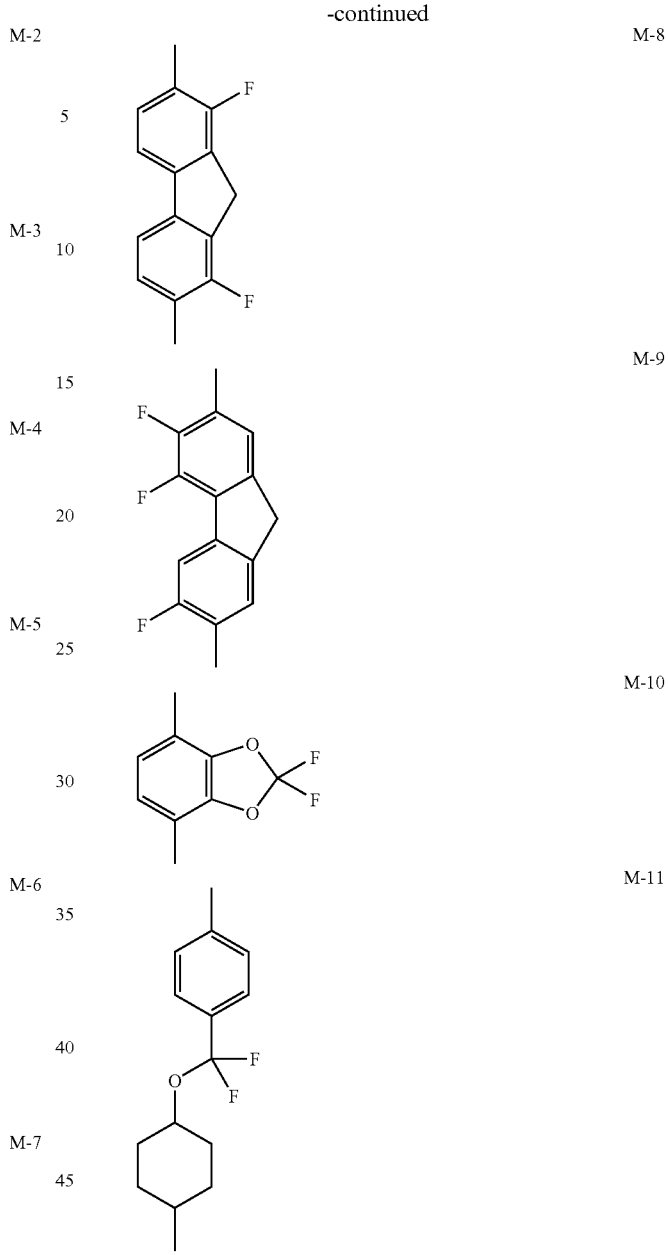
Among these specific examples, M-1, M-2, M-3, M-4, M-7, M-10 and M-11 are more preferable.
In formula (I), each of m and n independently represents an integer from 0 to 3, and preferably from 0 to 2. Total of m and n preferably falls in the range from 2 to 4.
Specific examples of the compounds represented by the formula (I) are shown below, without limitation.
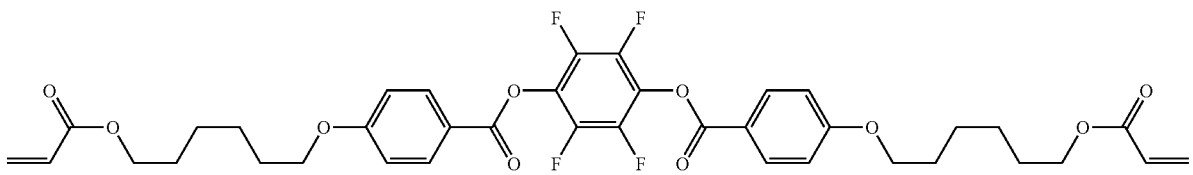

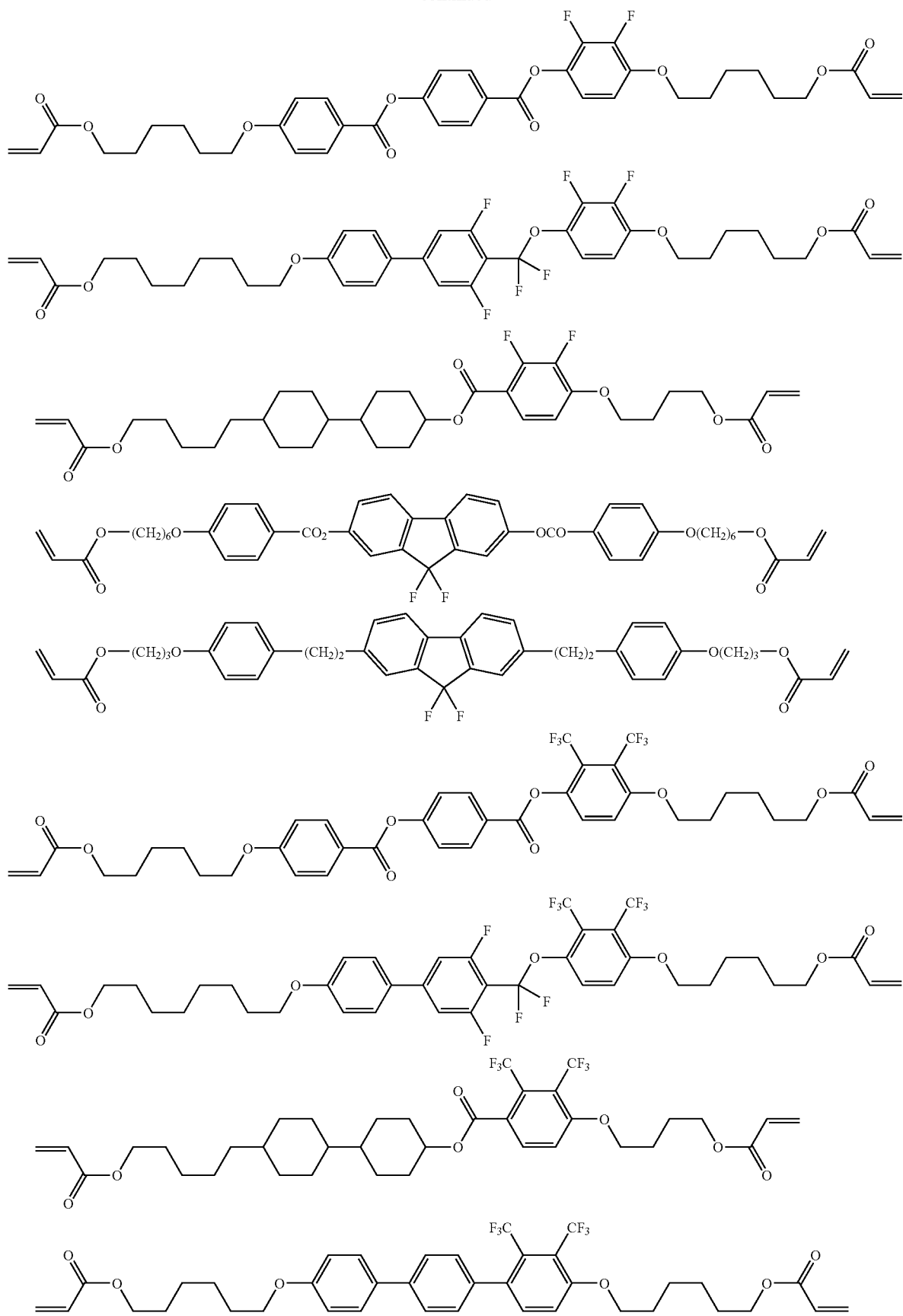

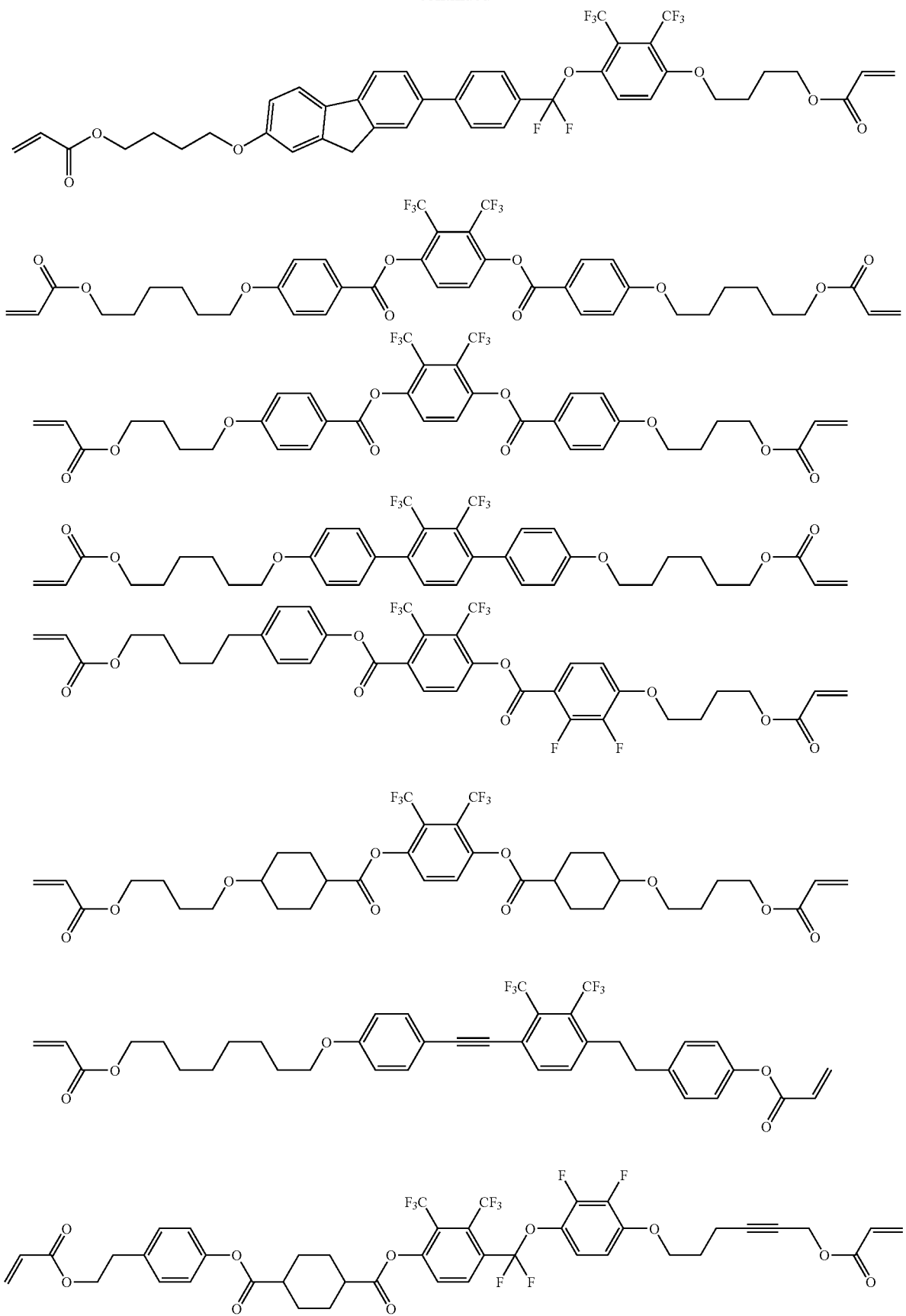

-continued
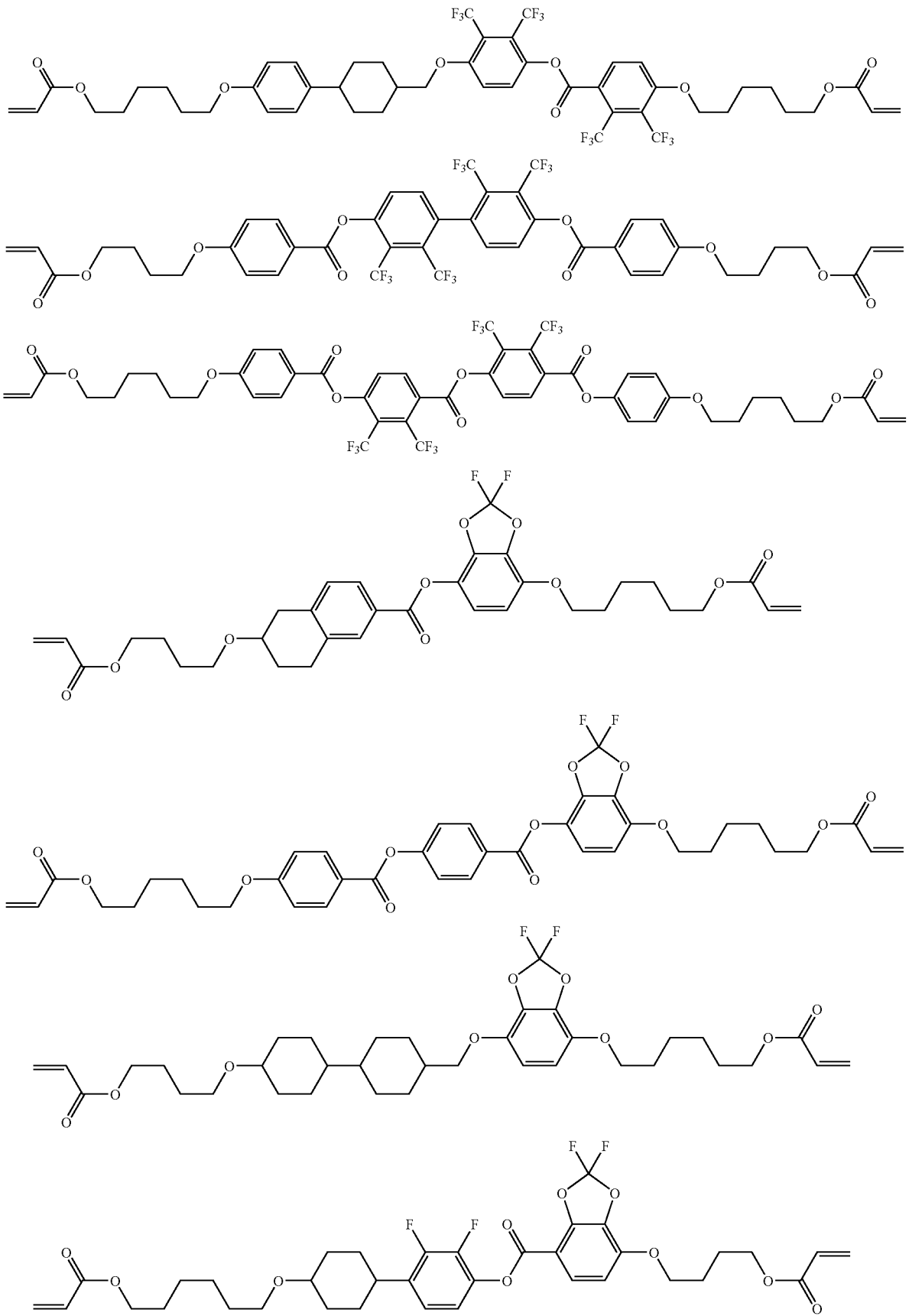

-continued
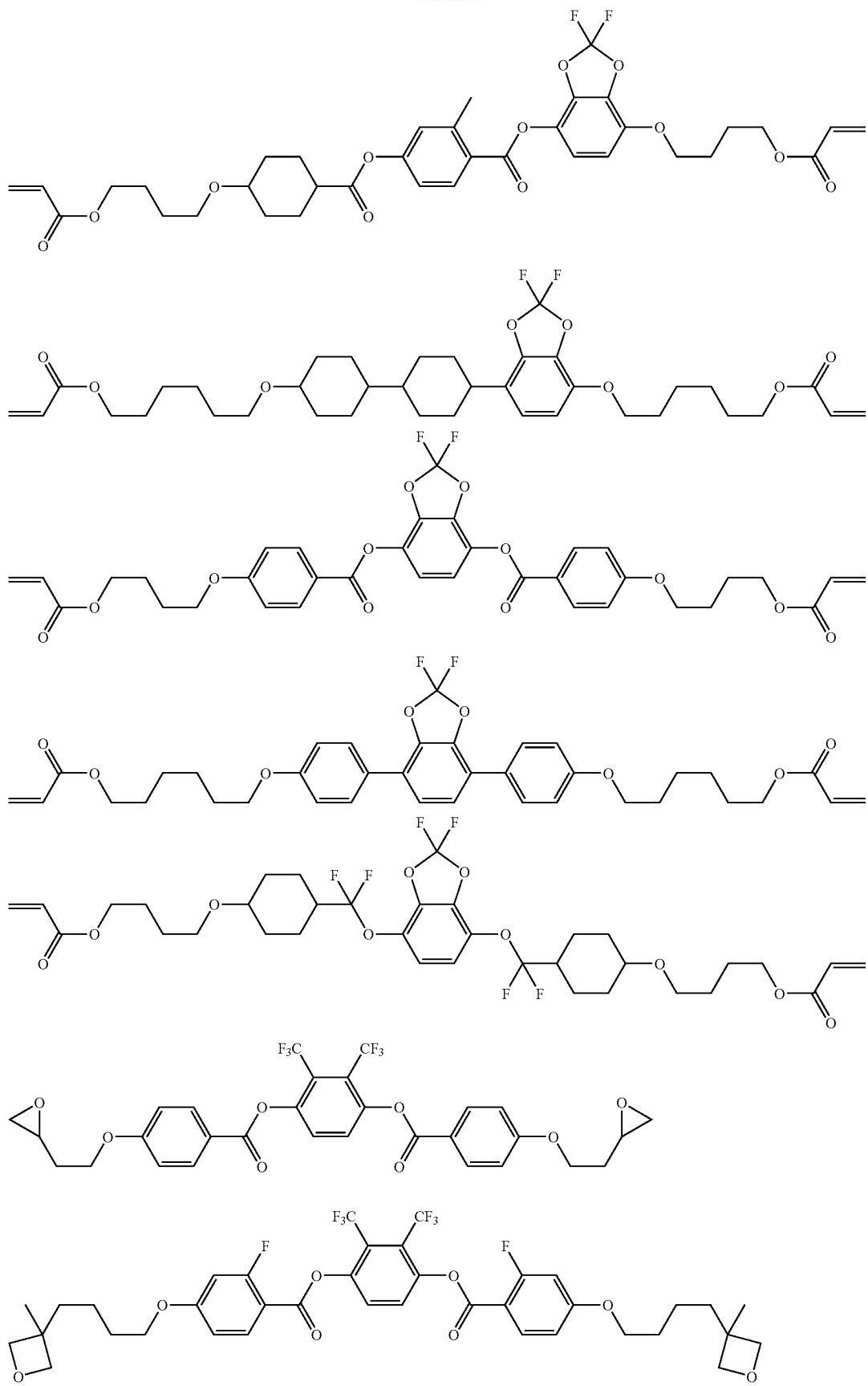

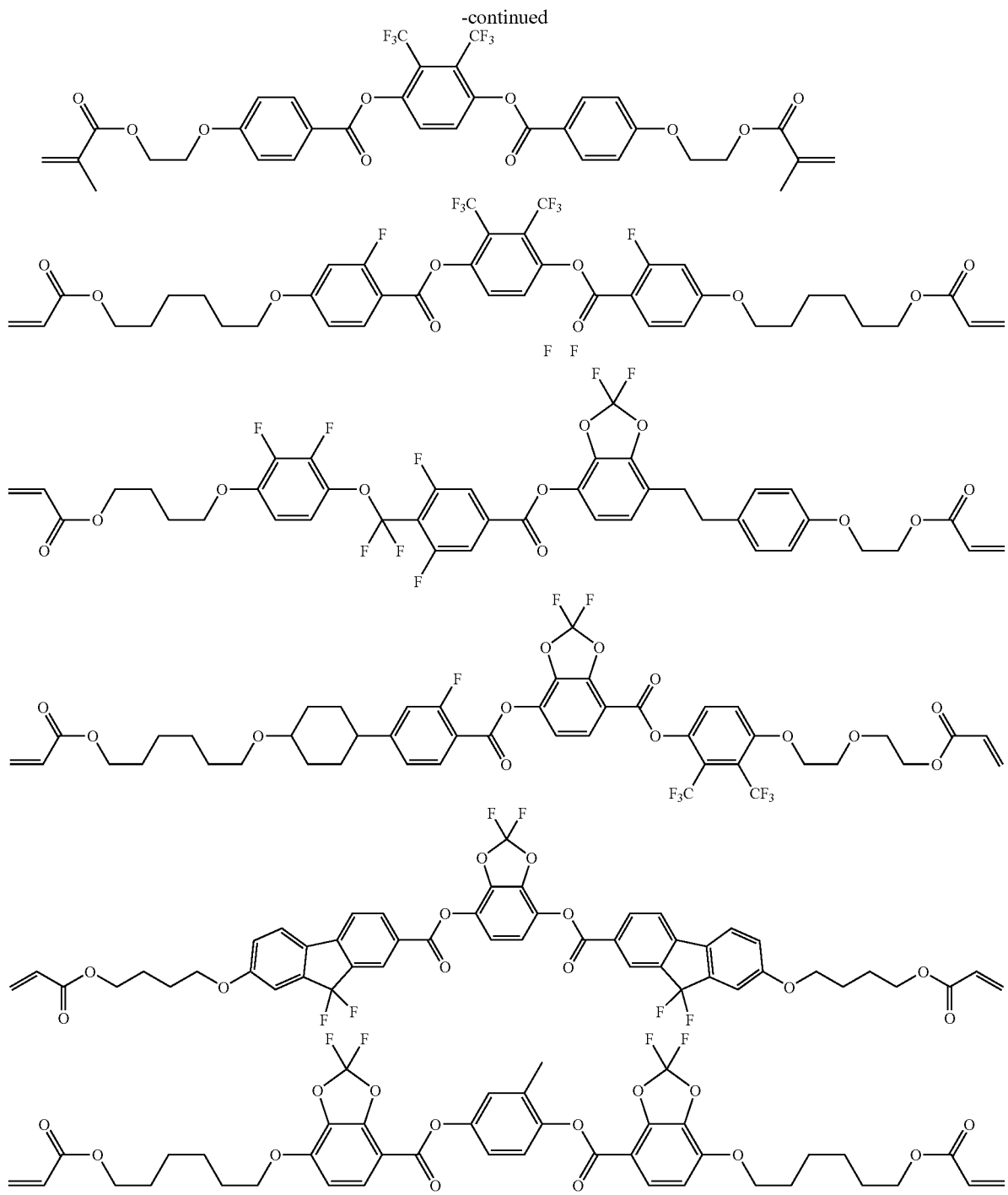

The compounds represented by the formula (I) may be synthesized by publicly-known methods. More specifically, they may be synthesized referring, for example, to the methods described in Japanese Laid-Open Patent Publication Nos. 2003-238491, and 2004-231638.

The compounds represented by the formula (I) show only unstable alignment solely by themselves, but are turned stable under the presence of a different species of liquid crystalline compound. In particular, if the liquid crystalline compound combined therewith is a rod-like liquid crystalline compound capable of aligning solely by itself on the air interface side with a certain degree of tilt angle, the compound contributes to make the rod-like liquid crystalline compound horizontally align, and at the same time, also make itself horizontally align in a stable manner. In an embodiment, one or more types of other liquid crystalline compounds to be combined therewith are selected from liquid crystal compounds have no fluorine atom. Preferable examples of the other liquid crystalline compound to be combined therewith include those represented by the formula (II) below:

$$P^{11}\text{-}L^{11}\text{-}(Z^{11}\text{-}A^{11})_m\text{-}Z^{13}\text{-}MB\text{-}Z^{14}\text{-}(A^{12}\text{-}Z^{12})_n\text{-}L^{12}\text{-}R^{10} \quad \text{Formula (II)}$$

where, $P^{11}$ represents a polymerizable group; each of $L^{11}$ and $L^{12}$ independently represents a divalent spacer group; each of $Z^{11}$ to $Z^{14}$ independently represents a divalent linking group; each of $A^{11}$ and $A^{12}$ independently represents a divalent cyclic group; each of m and n independently represents an integer from 0 to 3; MB represents any one group of B-I to B-III below:

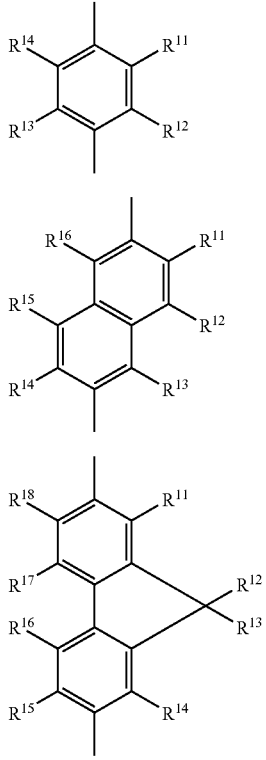

B-I

B-II

B-III

[each of $R^{11}$ to $R^{18}$ independently represents a hydrogen atom, bromine atom, —CN, —COR (R represents a hydrogen atom, or alkyl group having 1 to 6 carbon atoms), —COOR (R represents a hydrogen atom, or alkyl group having 1 to 6 carbon atoms), alkyl group having 1 to 6 carbon atoms, alkoxy group having 1 to 6 carbon atoms, or alkenyl group having 1 to 6 carbon atoms]; and $R^{10}$ represents a hydrogen atom or substituent.

Each of $P^{11}$, $L^{11}$, $L^{12}$, $Z^{11}$ to $Z^{14}$, $A^{11}$, $A^{12}$ and $R^{10}$ in the formula (II) are synonymous to $P^1$, $L^1$, $L^2$, $Z^1$ to $Z^4$, $A^1$, $A^2$, and $R^0$ in formula (I), respectively, with the same preferable ranges. The preferable ranges apply also to n and m.

In the formula (II), MB represents any one of formulae B-I to B-III in the above. Specific examples of MB include the examples below, without limitation:

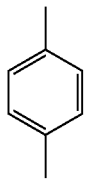

B-1

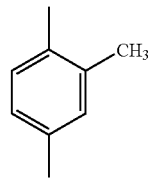

B-2

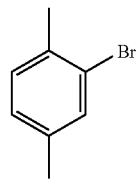

B-3

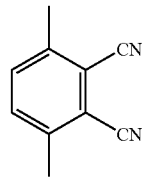

B-4

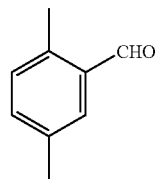

B-5

B-6

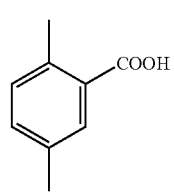

B-7

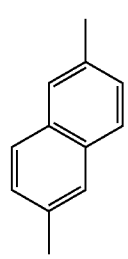

B-8

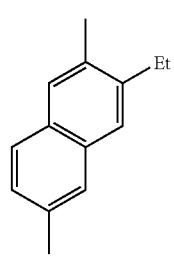

B-9

-continued
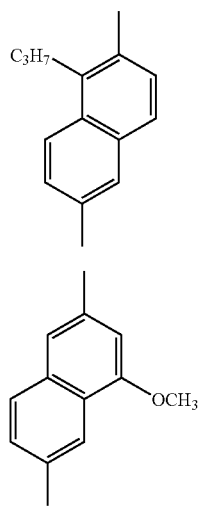
B-10
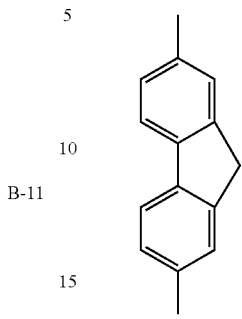
B-11
B-12
Specific examples of the compounds represented by the formula (II) will be shown below, without limitation.
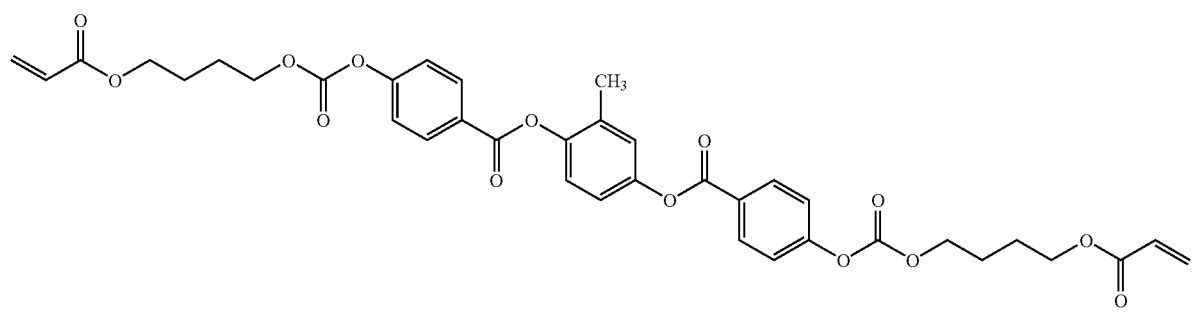
V-1)
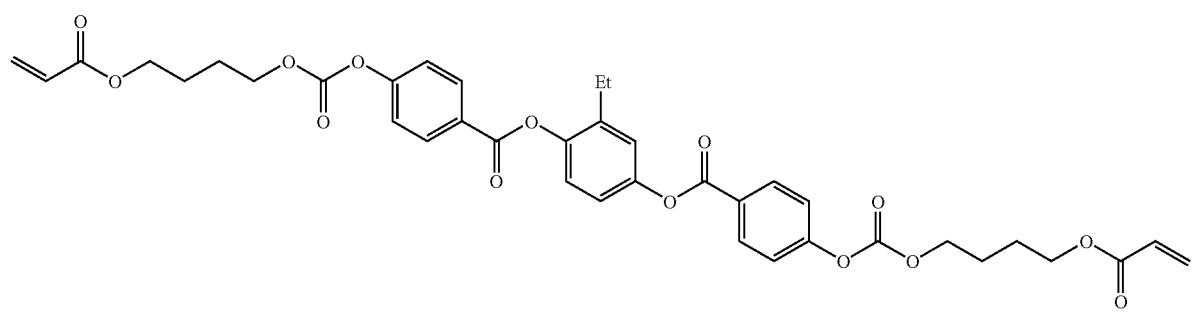
V-2)
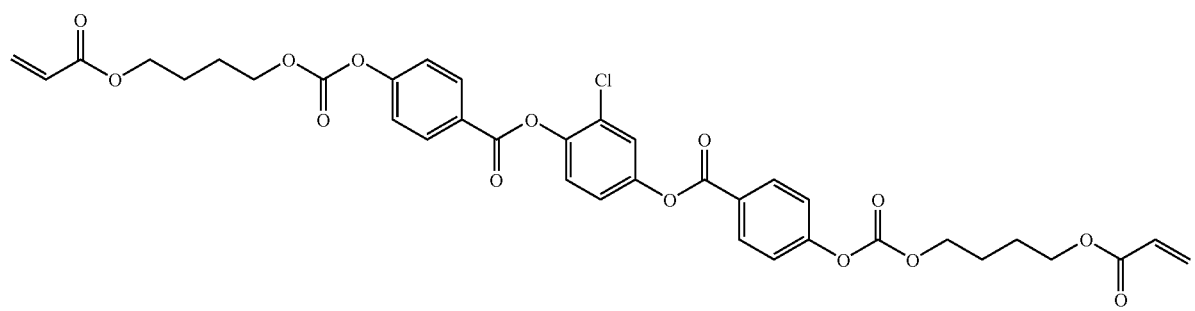
V-3)

-continued
V-4)
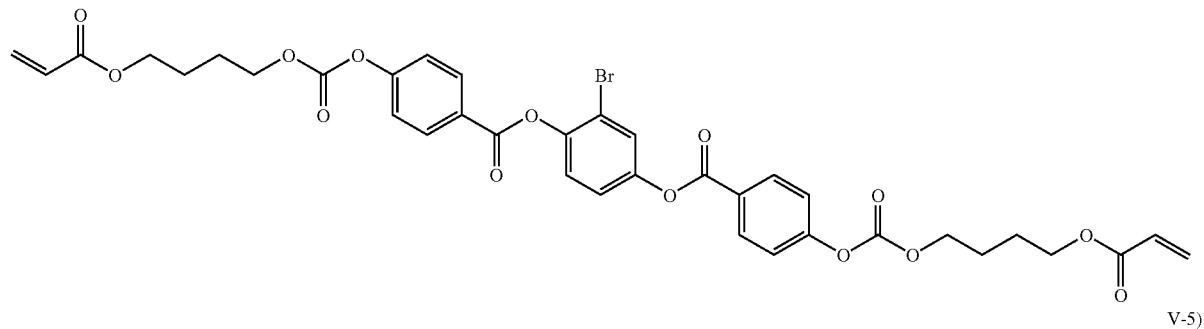
V-5)
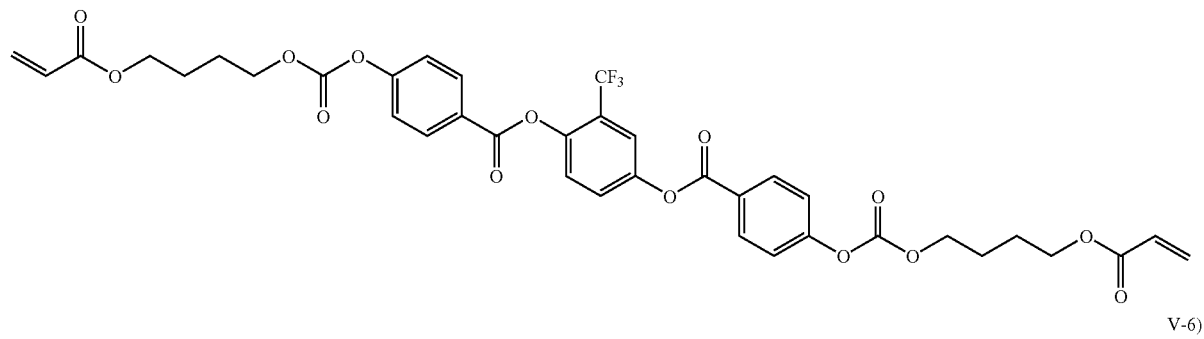
V-6)
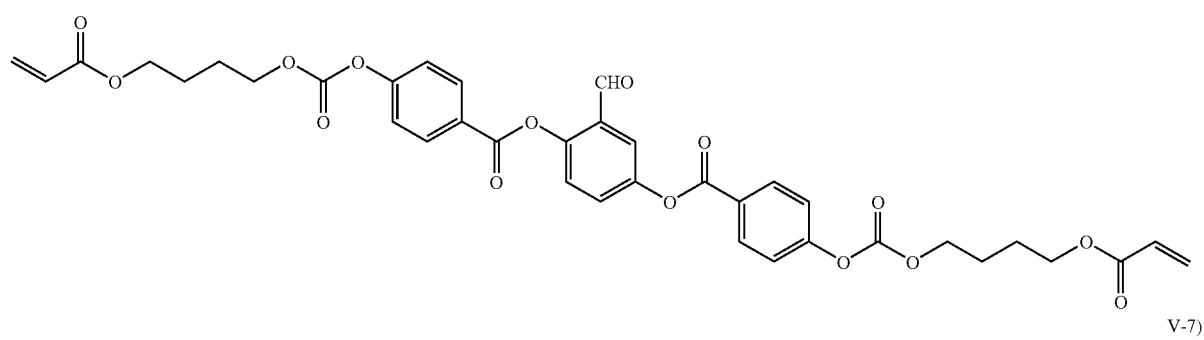
V-7)
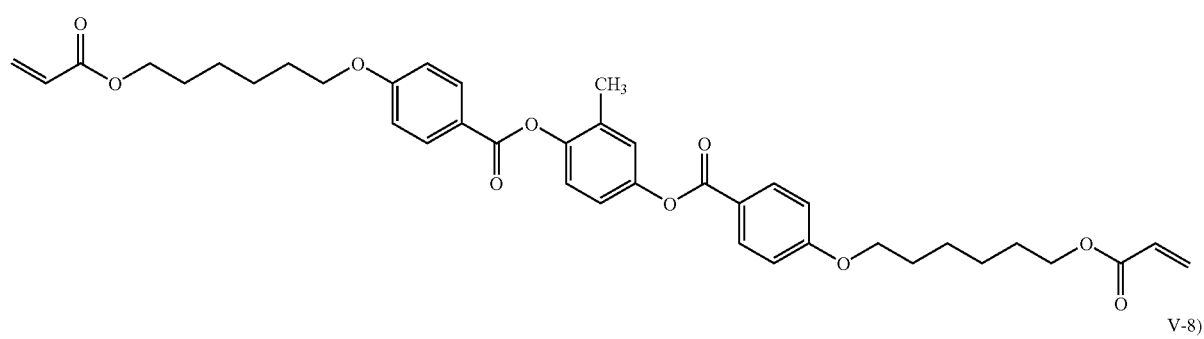
V-8)
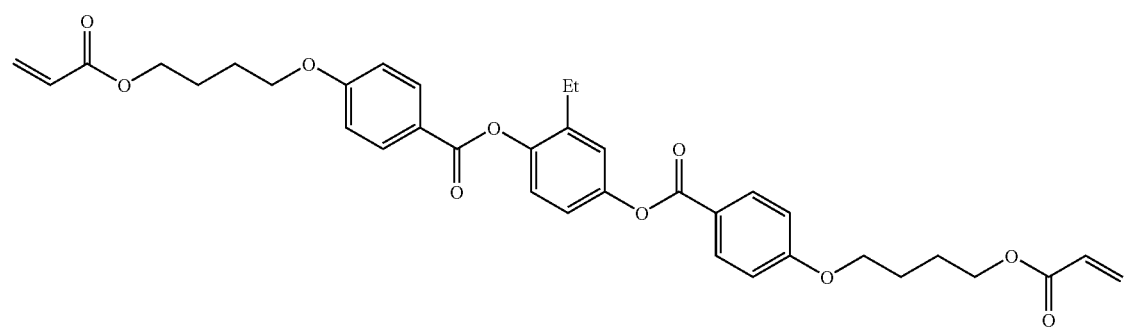

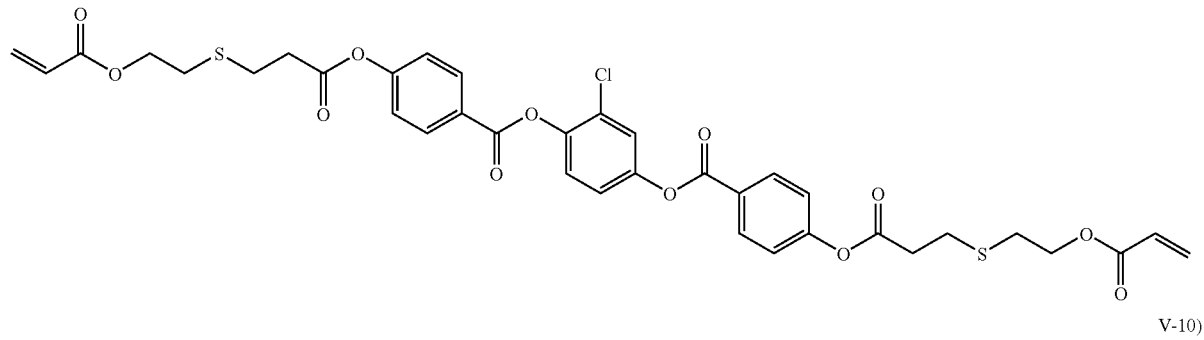
V-9)
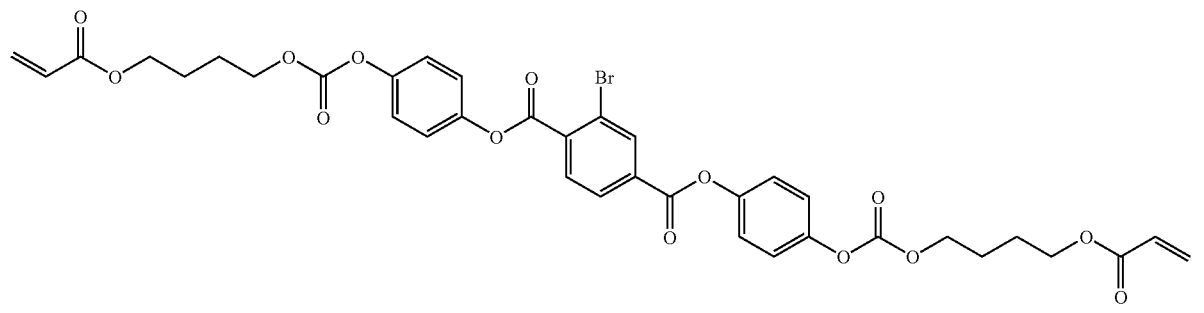
V-10)
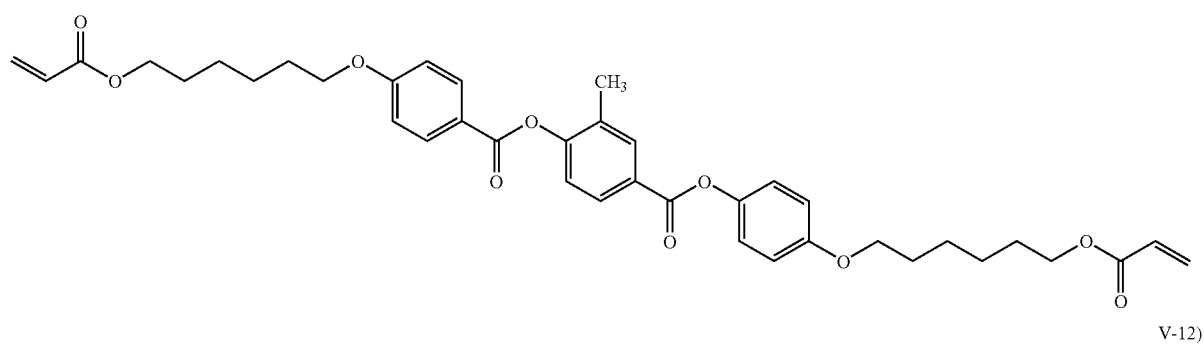
V-11)
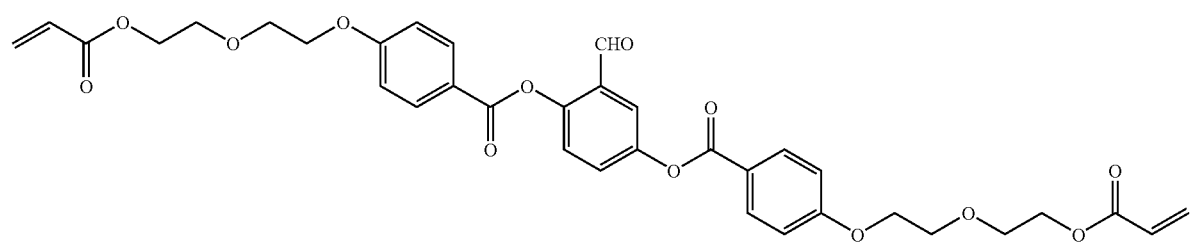
V-12)
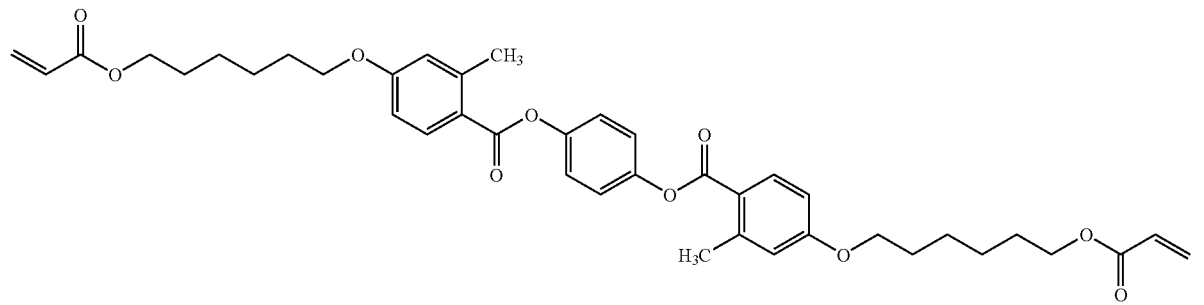
V-13)

-continued
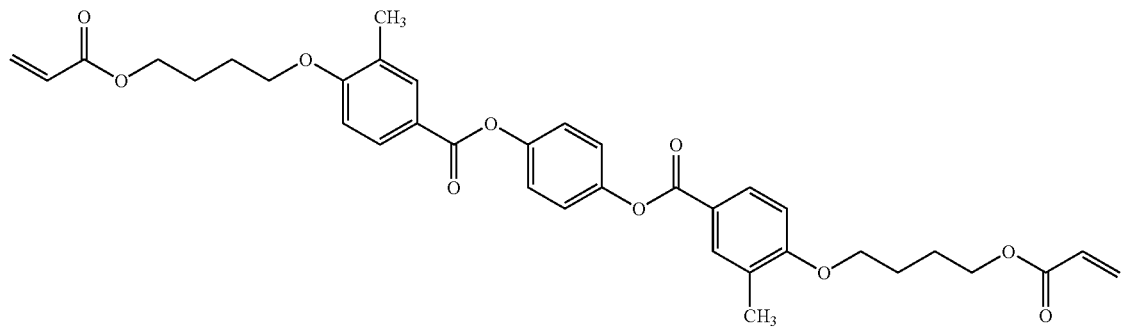
V-14)
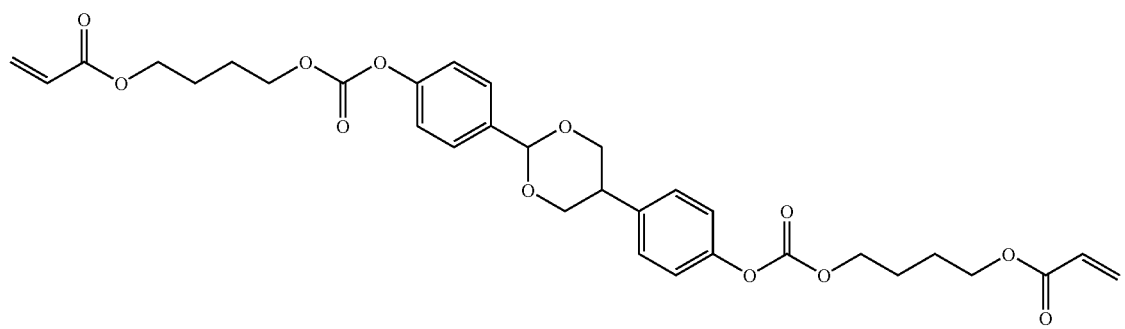
V-15)
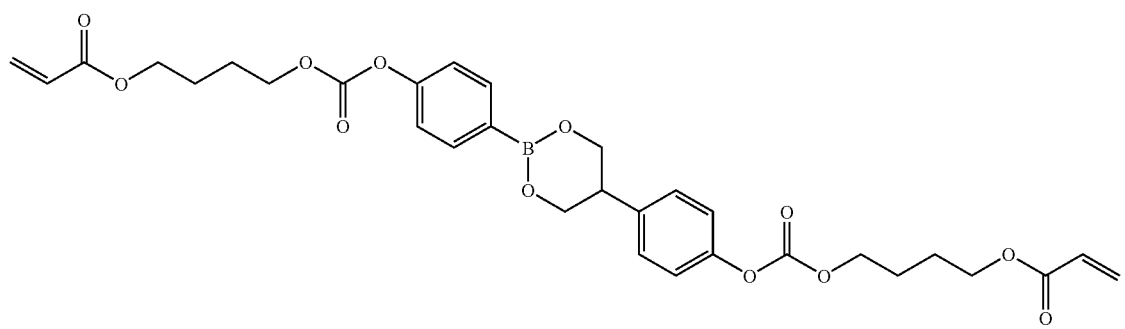
V-16)
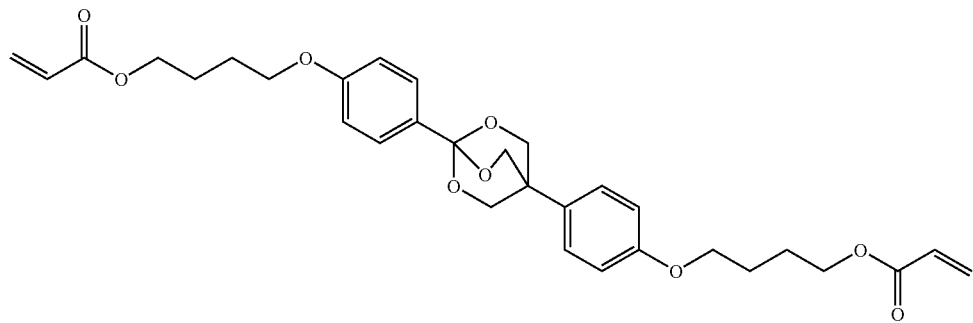
V-17)
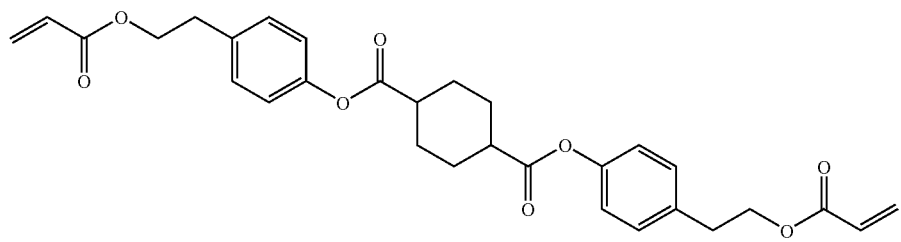
V-18)

-continued

V-19
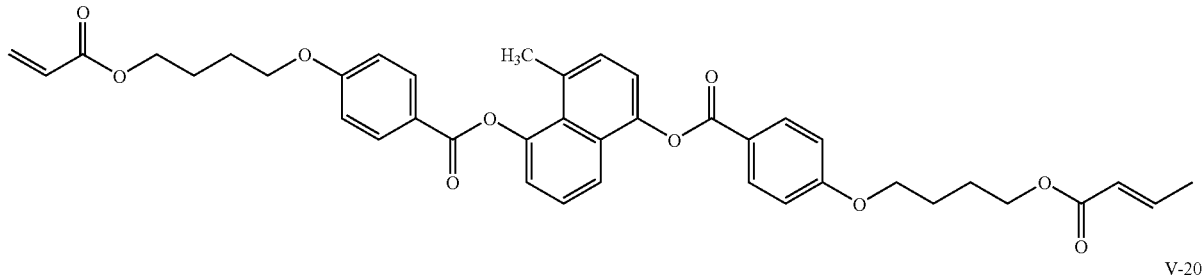

V-20
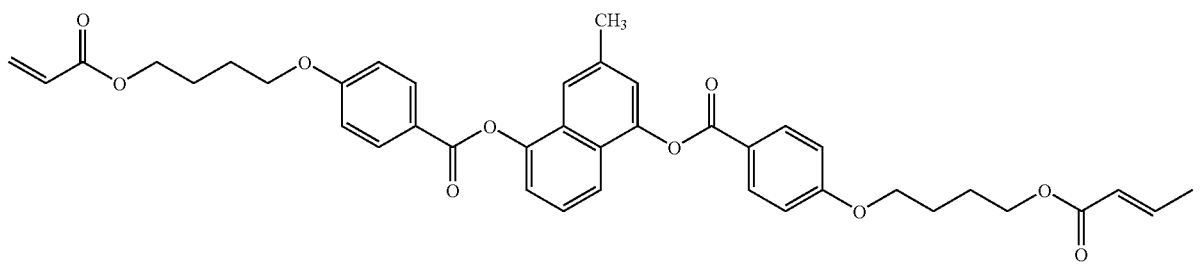

V-21
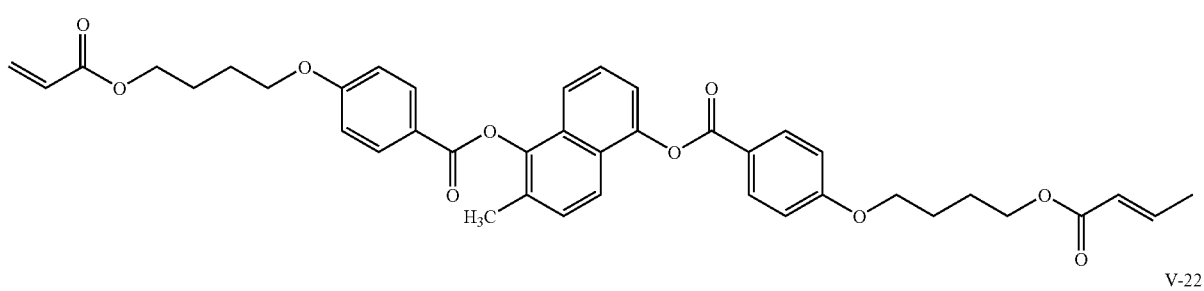

V-22
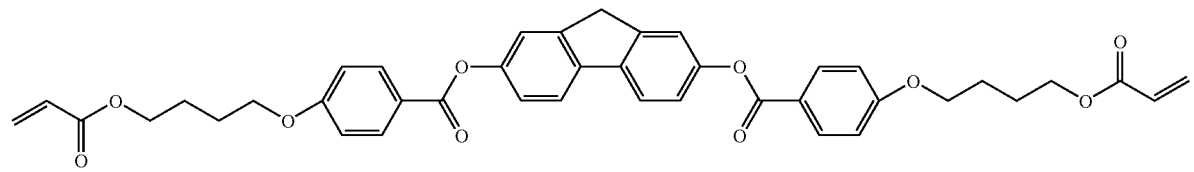

The liquid crystal composition of the present invention contains preferably 20 to 80% by mass, more preferably 30 to 80% by mass, and still more preferably 40 to 80% by mass of the liquid crystal compound represented by the formula (I), relative to the total mass of the plurality of liquid crystalline compound contained therein. The content of the liquid crystal compound represented by the formula (I) within the above-described ranges may be preferable because the liquid crystal composition may horizontally be aligned in a stable manner.

The composition of the present invention preferably contains, together with the liquid crystalline compound represented by the formula (I) and other liquid crystal compound, various additives such as polymerization initiator, plasticizer, surfactant, polymerizable monomer and so forth. These materials may be added for various purposes of, for example, fixing the alignment, improving uniformity in the coated film, improving strength of the film, alignability of the liquid crystalline compound and so forth. These materials are preferably compatible with the rod-like liquid crystalline compound combined therewith, and are not inhibitive to the alignment.

The present invention relates also to a retardation film composed of the liquid crystal composition of the present invention. An exemplary method of manufacturing the retardation film of the present invention is as follows.

The liquid crystal composition of the present invention is prepared in a form coating liquid. The coating liquid is coated on a rubbed surface of a horizontal alignment film (for example, polyimide alignment film, polyvinyl alcohol alignment film and so forth). The resultant coated film is dried optionally under heating, to thereby vaporize the solvent off, and to align the liquid crystal compound. Next, a polymerization reaction is allowed to proceed under applied light and/or heat so as to fix the state of alignment, to thereby obtain a retardation film.

The retardation film of the present invention may be adoptable to various applications such as optical compensation of liquid crystal display devices.

EXAMPLES

The present invention will be explained to further detail, referring to Examples. Note that the materials, reagents, amounts and ratios of substances, operations and so forth explained in Examples below may appropriately be modified without departing from the spirit of the present invention. The scope of the present invention is, therefore, not limited to the specific examples described below.

1. Example 1

1.-1 Preparation of Horizontal Alignment Film

A horizontal alignment film material "SE-150" from Nissan Chemical Industries, Ltd. was diluted with N-methyl-2-pyrrolidone to thereby prepare a solution having a solid content of 4% by mass. The solution was coated on an 1-mm thick glass substrate using a spinner, and the coated solution was dried at 200° C. for 60 minutes to thereby form a coated film having a dry film thickness of 0.08 µm. The coated film was then rubbed on the surface thereof, to thereby form a horizontal alignment film.

1.-2 Preparation of Liquid Crystal Composition Solution

Liquid crystal compound (A) shown below, and liquid crystal compound (B) shown below were mixed at ratios listed in Table 1, the mixture was further added with 3.0 parts by mass of a polymerization initiator (Irgacure 819 from CIBA Specialty Chemicals, Inc.), and diluted with N-methyl-2-pyrrolidone, to thereby obtain solutions A to F having a solid content of 25% by mass.

1.-3 Formation of Retardation Film

Each of the individual solutions prepared in the above was coated by spin coating on the rubbed surface of the horizontal alignment film formed on the glass substrate as described in the above, and the coating was heated at 130° C. for 1 minute. The resultant coating was then irradiated with ultraviolet radiation at an energy of 400 mJ/cm² so as to allow a polymerization reaction to proceed, to thereby form a film. All of the resultant films were found to have a dry film thickness of 1.5 µm.

Optical characteristics of each of thus-manufactured film were measured using a Muller matrix polarimeter from AXO-METRICS Inc. (U.S.A.), to thereby examine tilt of the slow axis. Results are shown in Table 1.

TABLE 1

| | Liquid crystal compound (A) represented by formula (II) (% by mass)[1] | Liquid crystal compound (B) represented by formula (I) (% by mass)[1] | Average tilt angle (°) |
|---|---|---|---|
| Solution A | 100 | 0 | 35 |
| Solution B | 80 | 20 | 9 |
| Solution C | 60 | 40 | 4 |
| Solution D | 40 | 60 | 2 |
| Solution E | 20 | 80 | 2 |
| Solution F | 0 | 100 | not measurable |

[1]relative to the total mass of liquid crystal compounds (A) and (B)

It was found that liquid crystal compound (A) alone showed inclination of the slow axis, meanwhile the slow axis aligned almost horizontally when added with 20% by mass or more of liquid crystal compound (B) represented by the formula (I). On the other hand, the liquid crystal compound (B) alone showed non-uniform state of alignment after the polymerization, only to inhibit measurement of retardation.

Liquid crystal compound (A)

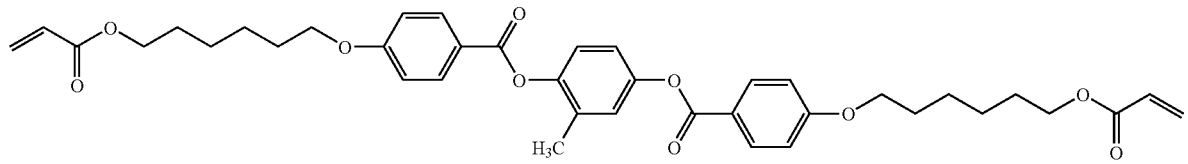

Liquid crystal compound (B)

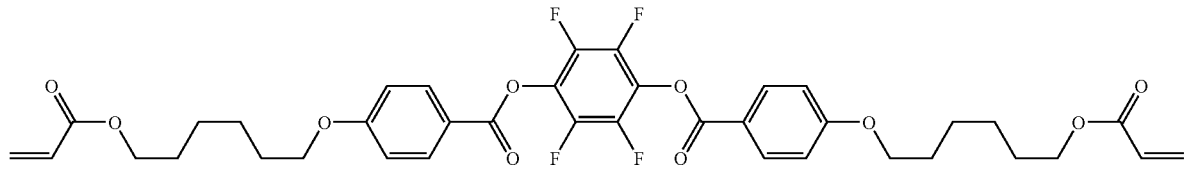

2. Example 2

The solutions were prepared and the retardation films were formed similarly to as described in the above, except that liquid crystal compound (B) used for solution C in Example 1 was replaced with liquid crystal compounds (C), (D), (E) and (F) (all of which being compounds represented by the formula (I)). Measurement of the optical characteristics of the individual resultant films aimed at finding inclination of the slow axes revealed that all films aligned their slow axes almost horizontally.

Liquid crystal compound C

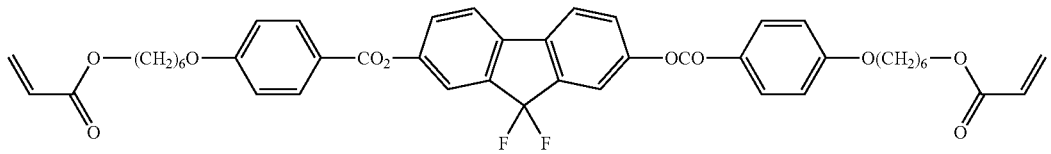

Liquid crystal compound D

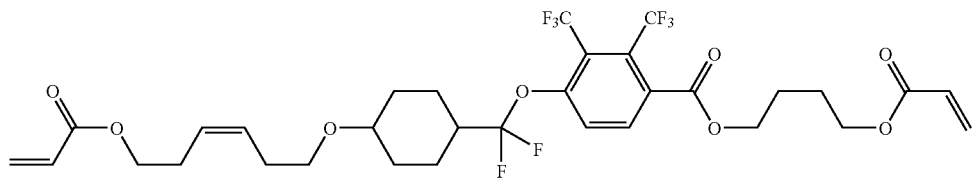

Liquid crystal compound E

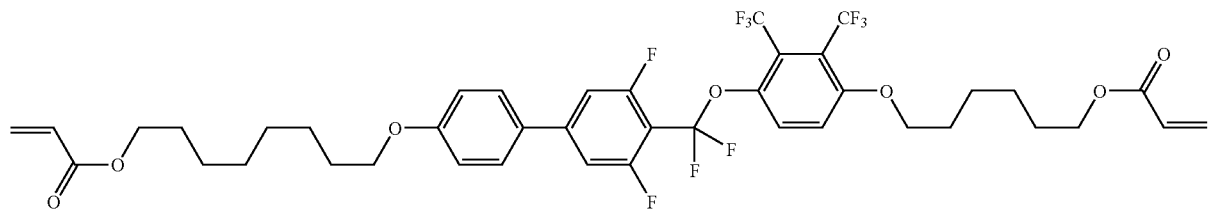

Liquid crystal compound F

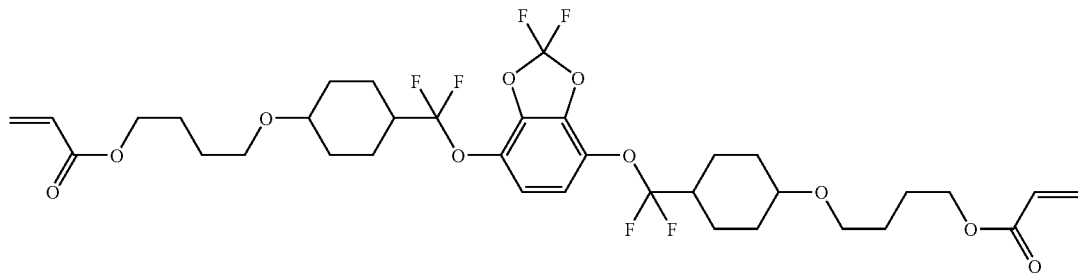

3. Example 3

The solutions were prepared and the retardation films were formed similarly to as described in the above, except that liquid crystal compound (A) used for solution C in Example 1 was replaced with liquid crystal compounds (G) and (H) (both of which being compounds represented by the formula (II)). Measurement of the optical characteristics of the individual resultant films aimed at finding inclination of the slow axes revealed that both films aligned their slow axes almost horizontally.

Liquid crystal compound H

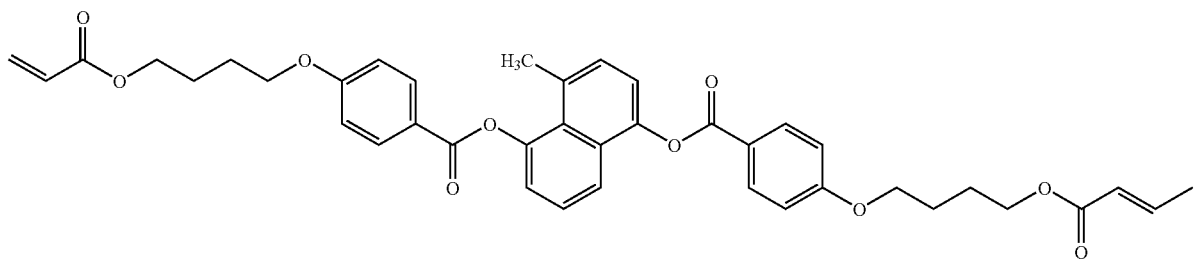

Liquid crystal compound G

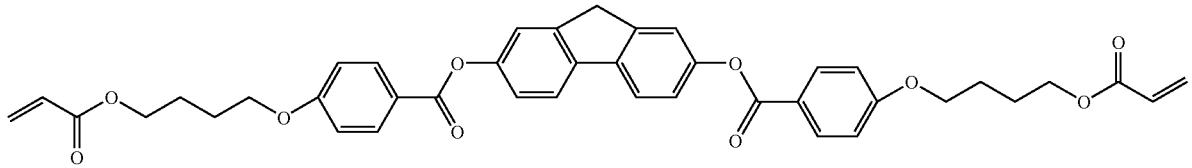

The invention claimed is:

1. A retardation film comprising a liquid crystal composition comprising two or more species of liquid crystal compounds respectively having a polymerizable group, at least one species of which being a compound represented by formula (I) below, having a content of the compound represented by the formula (I) of from 20% by mass to 80% by mass relative to the total mass of said two or more species of liquid crystal compounds:

$$P^1\text{-}L^1\text{-}(Z^1\text{-}A^1)_m\text{-}Z^3\text{-}MA\text{-}Z^4\text{-}(A^2\text{-}Z^2)_n\text{-}L^2\text{-}R^0 \quad \text{Formula (I)}$$

where, $P^1$ represents a polymerizable group; each of $L^1$ and $L^2$ independently represents a divalent spacer group; each of $Z^1$ to $Z^4$ independently represents a divalent linking group; each of $A^1$ and $A^2$ independently represents a divalent cyclic group; each of m and n independently represents an integer from 0 to 3; $R^0$ represents a hydrogen atom or substituent; MA represents any one group selected from the group consisting of M-1, M-5, M-6, M-8, M-9 and M-11 below:

M-1
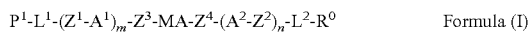

M-5
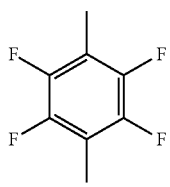

M-6
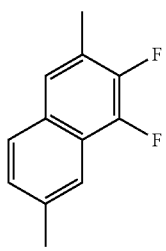

M-8
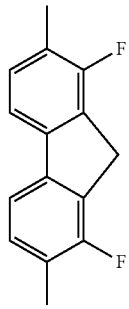

M-9
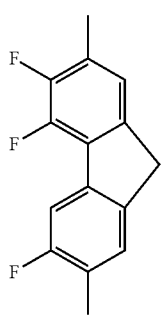

M-11
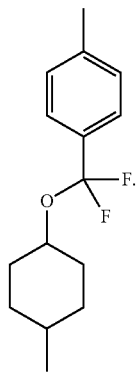

2. The retardation film according to claim 1, wherein the content of the compound represented by formula (I) is from 40% by mass to 80% by mass relative to the total mass of said two or more species of liquid crystal compounds.

3. The retardation film according to claim 1, wherein $R^0$ in formula (I) represents a hydrogen atom, alkyl group or polymerizable group.

4. The retardation film according to claim 1, wherein $P^1$ in formula (I) represents a group represented by any one of formulae P1, P2, P3 and P4 below:

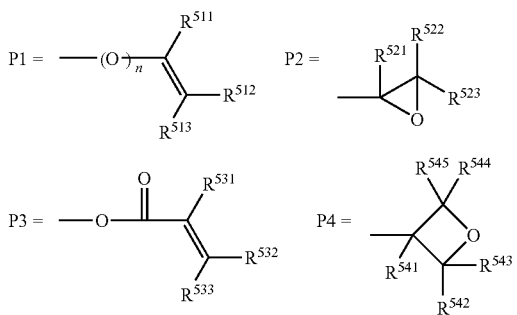

where, each of $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently represents a hydrogen atom or alkyl group, and n represents 0 or 1.

5. The retardation film according to claim 1, wherein MA in formula (I) represents M-1.

6. The retardation film according to claim 1, wherein each of $A^1$ and $A^2$ is a substituted or non-substituted phenyl group, or substituted or non-substituted cyclohexyl group.

7. The retardation film according to claim 1, wherein each of $Z^1$ to $Z^4$ in formula (I) independently represents a single bond or a group selected from the group consisting of

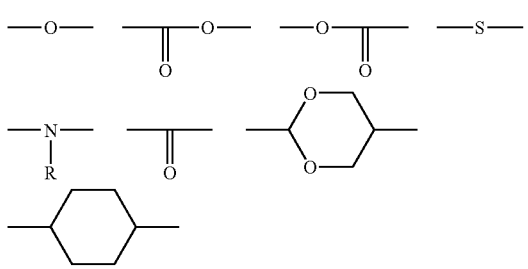

—O—CF$_2$—, alkylene group having 1 to 6 carbon atoms, and
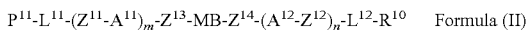

8. The retardation film according to claim 1, wherein each of $L^1$ and $L^2$ in formula (I) independently represents a single bond, or alkylene group having 1 to 20 carbon atoms, provided that, in the alkylene group, an arbitrary —CH$_2$— may be replaced by —O—, —S—, —COO—, —OCO—, —CH=CH—, —CF=CF— or —C≡C—, and an arbitrary hydrogen atom may be replaced by a halogen atom.

9. The retardation film according to claim 1, comprising a compound represented by formula (II) below, with a content of 20% by mass or more and 80% by mass or less relative to the total mass of said two species or more of liquid crystal compounds:

$$P^{11}\text{-}L^{11}\text{-}(Z^{11}\text{-}A^{11})_m\text{-}Z^{13}\text{-}MB\text{-}Z^{14}\text{-}(A^{12}\text{-}Z^{12})_n\text{-}L^{12}\text{-}R^{10} \quad \text{Formula (II)}$$

where, $P^{11}$ represents a polymerizable group; each of $L^{11}$ and $L^{12}$ independently represents a divalent spacer group; each of $Z^{11}$ to $Z^{14}$ independently represents a divalent linking group; each of $A^{11}$ and $A^{12}$ independently represents a divalent cyclic group; each of m and n represents an integer from 0 to 3; MB represents any one group of B-I to B-III below:

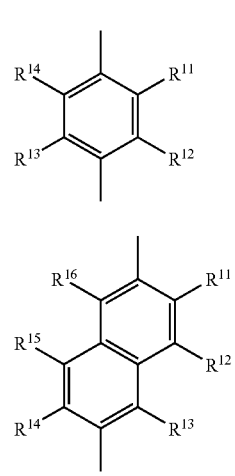

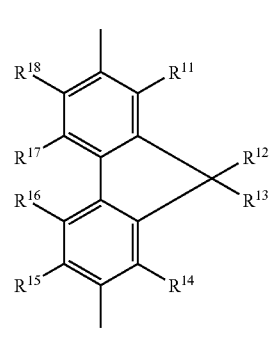

wherein each of $R^{11}$ to $R^{18}$ independently represents a hydrogen atom, bromine atom, —CN, —COR wherein R represents a hydrogen atom or alkyl group having 1 to 6 carbon atoms, —COOR wherein R represents a hydrogen atom or alkyl group having 1 to 6 carbon atoms, alkyl group having 1 to 6 carbon atoms, alkoxy group having 1 to 6 carbon atoms, or alkenyl group having 1 to 6 carbon atoms; and $R^{10}$ represents a hydrogen atom or substituent.

10. The retardation film according to claim 9, wherein the compound represented by formula (II) has no fluorine atom.

11. The retardation film according to claim 9, wherein MB in formula (II) represents any one of B-1 to B-12:

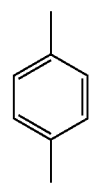

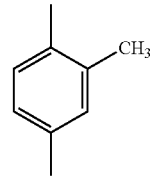

-continued

B-3 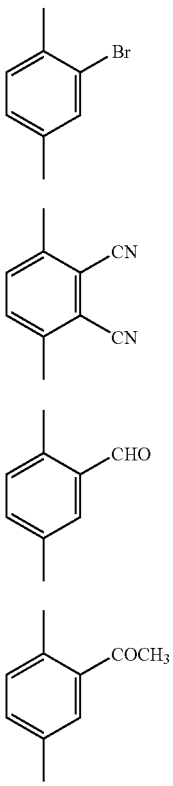

B-4

B-5

B-6

B-7

B-8

B-9

-continued

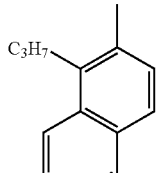 B-10

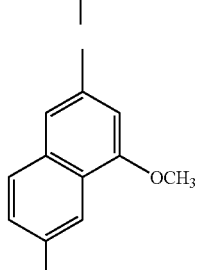 B-11

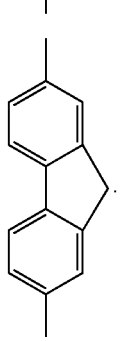 B-12

12. The retardation film according to claim 9, wherein $R^{10}$ in formula (II) represents a hydrogen atom, alkyl group or polymerizable group.

13. The retardation film according to claim 9, wherein $P^{11}$ in formula (II) represents a group represented by any one of formulae P1, P2, P3 and P4 below:

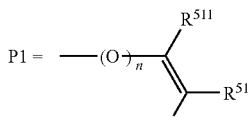 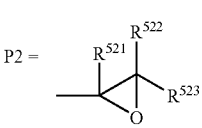

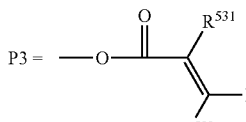 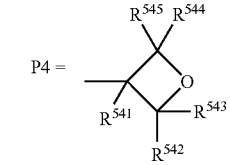

where, each of $R^{511}$, $R^{512}$, $R^{513}$, $R^{521}$, $R^{522}$, $R^{523}$, $R^{531}$, $R^{532}$, $R^{533}$, $R^{541}$, $R^{542}$, $R^{543}$, $R^{544}$ and $R^{545}$ independently represents a hydrogen atom or alkyl group, and n represents 0 or 1.

14. The retardation film according to claim 9, wherein each of $A^{11}$ and $A^{12}$ is a substituted or non-substituted phenyl group, or substituted or non-substituted cyclohexyl group.

15. The retardation film according to claim 9, wherein each of $Z^{11}$ to $Z^{14}$ in formula (II) independently represents a single bond or a group selected from the group consisting of

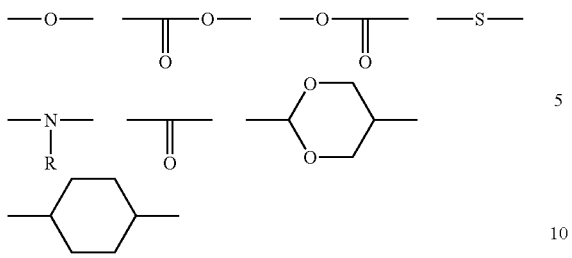

—O—CF$_2$—, alkylene group having 1 to 6 carbon atoms, and —≡—.

16. The retardation film according to claim 9, wherein each of L$^{11}$ and L$^{12}$ in formula (II) independently represents a single bond, or alkylene group having 1 to 20 carbon atoms, provided that, in the alkylene group, an arbitrary —CH$_2$— may be replaced by —O—, —S—, —COO—, —OCO—, —CH=CH—, —CF=CF— or —C≡C—, and an arbitrary hydrogen atom may be replaced by a halogen atom.

* * * * *